US012580640B2

(12) United States Patent
Roy et al.

(10) Patent No.: US 12,580,640 B2
(45) Date of Patent: Mar. 17, 2026

(54) GROUND SYSTEM TECHNIQUES TO SUPPORT FLEXIBLE RECONFIGURABLE SATELLITE PAYLOAD OPERATION

(71) Applicant: Hughes Network Systems, LLC, Germantown, MD (US)

(72) Inventors: Satyajit Roy, Gaithersburg, MD (US); Murali Regunathan, Germantown, MD (US); Rajeev Oza, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 341 days.

(21) Appl. No.: 18/196,150

(22) Filed: May 11, 2023

(65) Prior Publication Data

US 2023/0370160 A1    Nov. 16, 2023

Related U.S. Application Data

(60) Provisional application No. 63/340,910, filed on May 11, 2022.

(51) Int. Cl.
*H04W 72/04*        (2023.01)
*H04B 7/185*        (2006.01)
(Continued)

(52) U.S. Cl.
CPC .... *H04B 7/18519* (2013.01); *H04W 72/0453* (2013.01); *H04W 84/06* (2013.01)

(58) Field of Classification Search
CPC .... H04B 7/155; H04B 7/185; H04B 7/18536; H04B 7/18502; H04B 7/18504;
(Continued)

(56) References Cited

U.S. PATENT DOCUMENTS 7,599,686 B2    10/2009  Quinn et al.
7,958,041 B2    6/2011   Stanforth et al.
(Continued)

FOREIGN PATENT DOCUMENTS

DE      102013217564 A1     3/2015

OTHER PUBLICATIONS idirect.net [online], "Overview of adaptive TDMA in an iDirect evolution network," Mar. 2020, retrieved on Dec. 4, 2023, retrieved from URL<https://www.idirect.net/wp-content/uploads/2020/03/TechBrief-AdaptiveTDMA.pdf>, 8 pages.
(Continued)

*Primary Examiner* — Frank Duong
(74) *Attorney, Agent, or Firm* — Kilpatrick Townsend & Stockton LLP

(57)        ABSTRACT

Methods, systems, and apparatus, including computer programs encoded on computer-storage media, for ground system techniques to support flexible reconfigurable satellite payload operation. In some implementations, a satellite communication network is managed to operate in a first configuration. The satellite communication network includes a satellite having a payload that enables dynamic reconfiguration of carriers within a beam. A reconfiguration event is detected, and in response, a second configuration is determined for the satellite communication network. The second configuration differs from the first configuration in at least one of a set of carriers used for the beams or an assignment of the carriers to gateways. The satellite network is managed to operate in the second configuration, including at least one of (i) changing to a second set of carriers for the beams of the satellite or (ii) changing to a second assignment of the carriers to the gateways.

20 Claims, 16 Drawing Sheets

(51) Int. Cl.
*H04W 72/0453* (2023.01)
*H04W 84/06* (2009.01)

(58) Field of Classification Search
CPC ............ H04B 7/18506; H04B 7/18508; H04B
7/1851; H04B 7/18513; H04B 7/18515;
H04B 7/18517; H04B 7/18519; H04B
7/18521; H04B 7/18523; H04B 7/18528;
H04B 7/18532; H04B 7/18534; H04B
7/18576; H04B 7/18578; H04B 7/204;
H04B 7/2041; H04B 10/118; H04L
2012/5608; G01S 5/02; H04W 72/0453;
H04W 84/06; H04W 88/16
See application file for complete search history.

(56) References Cited

U.S. PATENT DOCUMENTS

| | | | |
|---|---|---|---|
| 8,144,643 B2 | 3/2012 | Miller et al. | |
| 8,818,283 B2 | 8/2014 | McHenry et al. | |
| 9,426,666 B2 | 8/2016 | Ha et al. | |
| 9,585,150 B2 | 2/2017 | Marsh et al. | |
| 9,730,227 B2 | 8/2017 | Marsh et al. | |
| 10,004,073 B1 | 6/2018 | Freedman et al. | |
| 10,104,177 B2 | 10/2018 | Roy et al. | |
| 10,142,998 B2 | 11/2018 | Roy | |
| 10,389,775 B2 | 8/2019 | Roy et al. | |
| 10,601,502 B2 | 3/2020 | Roy et al. | |
| 10,771,147 B2 | 9/2020 | Regunathan et al. | |
| 10,784,954 B2 | 9/2020 | Becker et al. | |
| 11,031,998 B2 | 6/2021 | Roy et al. | |
| 11,589,315 B2 | 2/2023 | Roy et al. | |
| 11,711,302 B2 | 7/2023 | Roy et al. | |
| 2009/0161617 A1 | 6/2009 | Abedi | |
| 2016/0072691 A1* | 3/2016 | Xu | H04B 7/18578 370/252 |
| 2016/0195618 A1 | 7/2016 | Baer et al. | |
| 2018/0006892 A1* | 1/2018 | Xu | H04L 47/20 |
| 2018/0097888 A1* | 4/2018 | Roy | H04L 43/028 |
| 2019/0132044 A1 | 5/2019 | Hreha et al. | |
| 2019/0165856 A1 | 5/2019 | Roy et al. | |
| 2019/0245613 A1* | 8/2019 | Roy | H04L 61/5061 |
| 2020/0059296 A1 | 2/2020 | Regunathan et al. | |
| 2020/0235778 A1 | 7/2020 | Merchlinsky | |
| 2020/0328804 A1 | 10/2020 | Xu et al. | |
| 2021/0044515 A1 | 2/2021 | Regunathan et al. | |
| 2021/0058293 A1 | 2/2021 | Whitefield et al. | |
| 2021/0160786 A1 | 5/2021 | Roy et al. | |
| 2022/0131600 A1 | 4/2022 | Regunathan | |
| 2022/0209853 A1 | 6/2022 | Border et al. | |
| 2023/0071786 A1 | 3/2023 | Regunathan et al. | |
| 2023/0188207 A1 | 6/2023 | Miller et al. | |
| 2023/0224024 A1 | 7/2023 | Mendelsohn et al. | |

OTHER PUBLICATIONS

International Search Report and Written Opinion in International Appln. No. PCT/US2023/021909, mailed on Sep. 4, 2023, 11 pages.
International Preliminary Report on Patentability in International Appln. No. PCT/US2023/021909, mailed on Nov. 21, 2024, 6 pages.

* cited by examiner

GROUND SYSTEM TECHNIQUES TO SUPPORT FLEXIBLE RECONFIGURABLE SATELLITE PAYLOAD OPERATION

CROSS-REFERENCE TO RELATED APPLICATIONS

This application claims the benefit of priority to U.S. Provisional Patent Application No. 63/340,910, filed on May 11, 2022, the contents of which are incorporated by reference herein.

BACKGROUND

The present specification relates to satellite networking, and in particular, optimization of ground systems to support flexible and reconfigurable satellite operations.

Many traditional satellite communication systems are designed to have fixed frequency plans and fixed mappings between gateways and user beams. This fixed arrangement allows for ease of configuration, operation, and management of the network but can also reduce flexibility of usage, scalability, and efficiency in the network.

SUMMARY

In some implementations, a satellite communication system provides a scalable and adaptable network architecture using satellites designed and deployed to provide reconfigurability using digitized channel architecture. The reconfigurability enables dynamic network frequency plans and dynamic mappings among user beams and gateways. This reconfigurability allows network's capacity and coverage to evolve and grow as demand and customer populations change over time. In some implementations, the satellite architectures can also provide a dynamic reconfiguration of the spatial coverage (e.g., range and location of geographic areas served) based on demand.

Many existing high-throughput satellite network architectures generally assume a fixed network with little to no reconfigurability in the satellite payload. For example, the gateway-to-user-beam mapping, frequency plans, and other system-wide parameters often cannot be changed and are assumed to be static throughout the life of the system. Nevertheless, with a reconfigurable satellite payload and appropriate support in the terrestrial system components, these and other parameter can be varied to improve coverage, throughput, efficiency, reliability, and other aspects of performance. As discussed further below, various network elements at various communication layers (e.g., physical layer, satellite link control/media access control layer, network layer, application layer, etc.) can be redesigned to leverage the capabilities of a reconfigurable satellite. For example, the terrestrial components or ground system can be optimized to support a versatile, reconfigurable satellite and to allow dynamic changes to the associations between gateways, data centers or satellite network cores, user beams, and other resources.

In one general aspect, a method performed by one or more computers includes: managing, by the one or more computers, a satellite communication network to operate in a first configuration, wherein the satellite communication network includes a satellite having a payload that enables dynamic reconfiguration of carriers within a beam, wherein the satellite communication network includes (i) multiple data centers or satellite network cores and (ii) multiple gateways, and wherein the first configuration includes a set of carriers for beams of the satellite and an assignment of the carriers to the gateways; detecting, by the one or more computers, a reconfiguration event while the satellite communication network is operating in the first configuration; in response to detecting the reconfiguration event, determining, by the one or more computers, a second configuration for the satellite communication network, wherein the second configuration differs from the first configuration in at least one of a set of carriers used for the beams or an assignment of the carriers to the gateways; and managing, by the one or more computers, the satellite communication network to operate in the second configuration, including at least one of (i) changing to a second set of carriers for the beams of the satellite or (ii) changing to a second assignment of the carriers to the gateways.

In some implementations, the method includes associating each of the multiple gateways to each of the multiple data centers or satellite network cores to enable redundancy to permit assignment of a spectrum chunk among the multiple gateways.

In some implementations, detecting the reconfiguration event comprises detecting a change to remove at least a portion of a first gateway in the satellite communication network, and the second configuration includes a reassignment of one or more carriers served by the first gateway to one or more second gateways in the satellite communication network.

In some implementations, detecting the reconfiguration event comprises detecting a change to add an additional gateway to the satellite communication network, and the second configuration includes a reassignment of one or more carriers served by the gateways of the satellite communication network to the additional gateway.

In some implementations, detecting the reconfiguration event comprises detecting a change to a spectrum allocation for a beam or gateway of the satellite communication network. Compared to the first configuration, the second configuration includes a change, for one or more of the carriers in a beam of the first configuration, to at least one of: a number of carriers in the beam; a bandwidth of one or more carriers in the beam; a center frequency of one or more carriers in the beam; or a symbol rate of one or more carriers in the beam.

In some implementations, detecting the reconfiguration event comprises detecting an unequal distribution of traffic or carriers among gateways of the satellite communication network. The second configuration includes a reassignment of one or more carriers served by a first gateway of the satellite communication network to one or more of the other gateways of the satellite communication network.

In some implementations, managing the satellite communication network to operate in the second configuration comprises causing two or more of the gateways in the satellite communication network to serve different carriers of a same beam of the satellite.

In some implementations, a first group of the gateways are associated with a first data center or satellite network core (DC/SNC), and a second group of gateways are associated with a second DC/SNC. Managing the satellite network to operate in the second configuration comprises transferring one or more carriers of a particular beam, wherein the one or more carriers are transferred from a particular gateway that is associated with the first DC/SNC to another gateway determined to be associated with the first DC/SNC, such that user traffic sessions are maintained after transferring the one or more carriers.

In some implementations, determining the second configuration for the satellite communication network comprises performing a dynamic outroute reconfiguration process that includes determining, for a forward link spectrum chunk at least one of: a number of outroute carriers; a symbol rate for each of the outroute carriers; a center frequency for each of the outroute carriers; or a bandwidth for each of the outroute carriers.

In some implementations, the dynamic outroute reconfiguration process comprises: determining the number of outroute carriers based on a bandwidth of the spectrum chunk, a measure of frequency roll-off, and a maximum symbol rate per outroute carrier; and determining the symbol rates determined based on the bandwidth of the spectrum chunk, the measure of frequency roll-off, and the determined number of outroute carriers.

In some implementations, the dynamic outroute reconfiguration process comprises: defining an outroute channel layout for the outroute carriers including (i) defining frequency characteristics for a first outroute carrier based on a boundary of the spectrum chunk, a symbol rate assigned for the first outroute carrier, and a measure of frequency roll-off, and (ii) after defining the frequency characteristics for the first outroute carrier, defining frequency characteristics for one or more additional outroute carriers based on a bandwidth of the first outroute carrier; and assigning the outroute carriers to one or more of the gateways in the satellite communication network.

In some implementations, the dynamic outroute reconfiguration process comprises determining an assignment of outroute carriers to modulators of the gateways and mapping the outroute carriers to corresponding hardware ports in the gateways.

In some implementations, determining the second configuration for the satellite communication network comprises performing a dynamic inroute reconfiguration process that includes determining, for a return link spectrum chunk at least one of: a number of inroute carriers; center frequencies for the inroute carriers; or bandwidths for the outroute carriers.

In some implementations, determining the second configuration for the satellite communication network comprises performing a dynamic inroute reconfiguration process that comprises: at least one of creating one or more inroute carriers, creating one or more inroute carrier groups, or adjusting one or more inroute carrier groups to add or remove an inroute carrier; and assigning inroute carriers or inroute carrier groups to demodulators of the gateways and inroute group managers of the data centers or satellite network cores.

In some implementations, performing the dynamic inroute reconfiguration process comprises at least one of: creating one or more inroute carriers from a spectrum chunk assigned to one or more of the gateways in the satellite network; changing an assignment of inroute carriers to inroute group managers; redefining properties of one or more inroute carriers when moving an inroute carrier to a different inroute group manager or to a different demodulator; spitting an inroute carrier into multiple inroute carriers; and merging two or more inroute carriers into a single inroute carrier.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
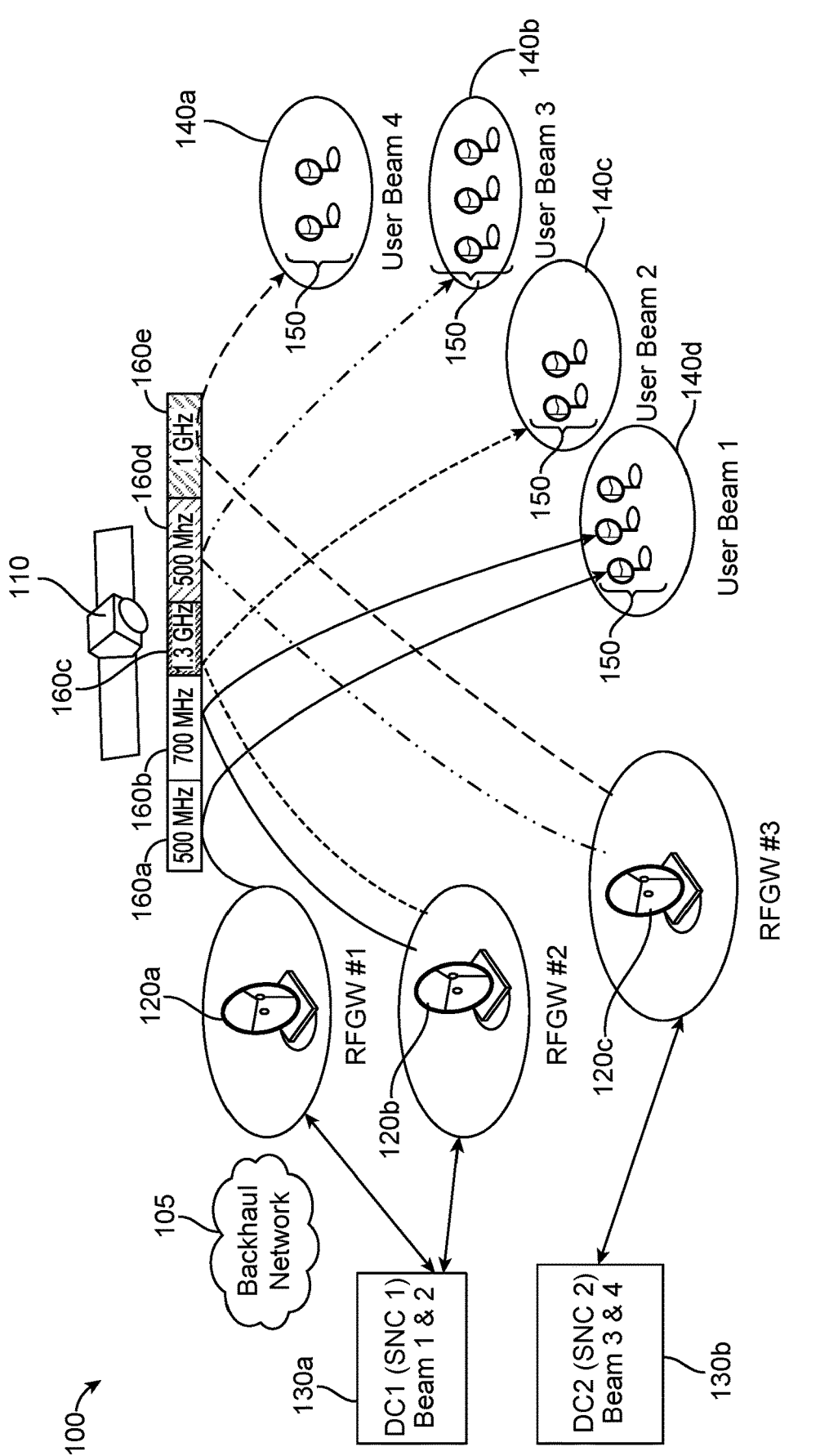
FIG. 1A is a diagram showing an example of a network configuration for satellite network service.
Figure 1B:
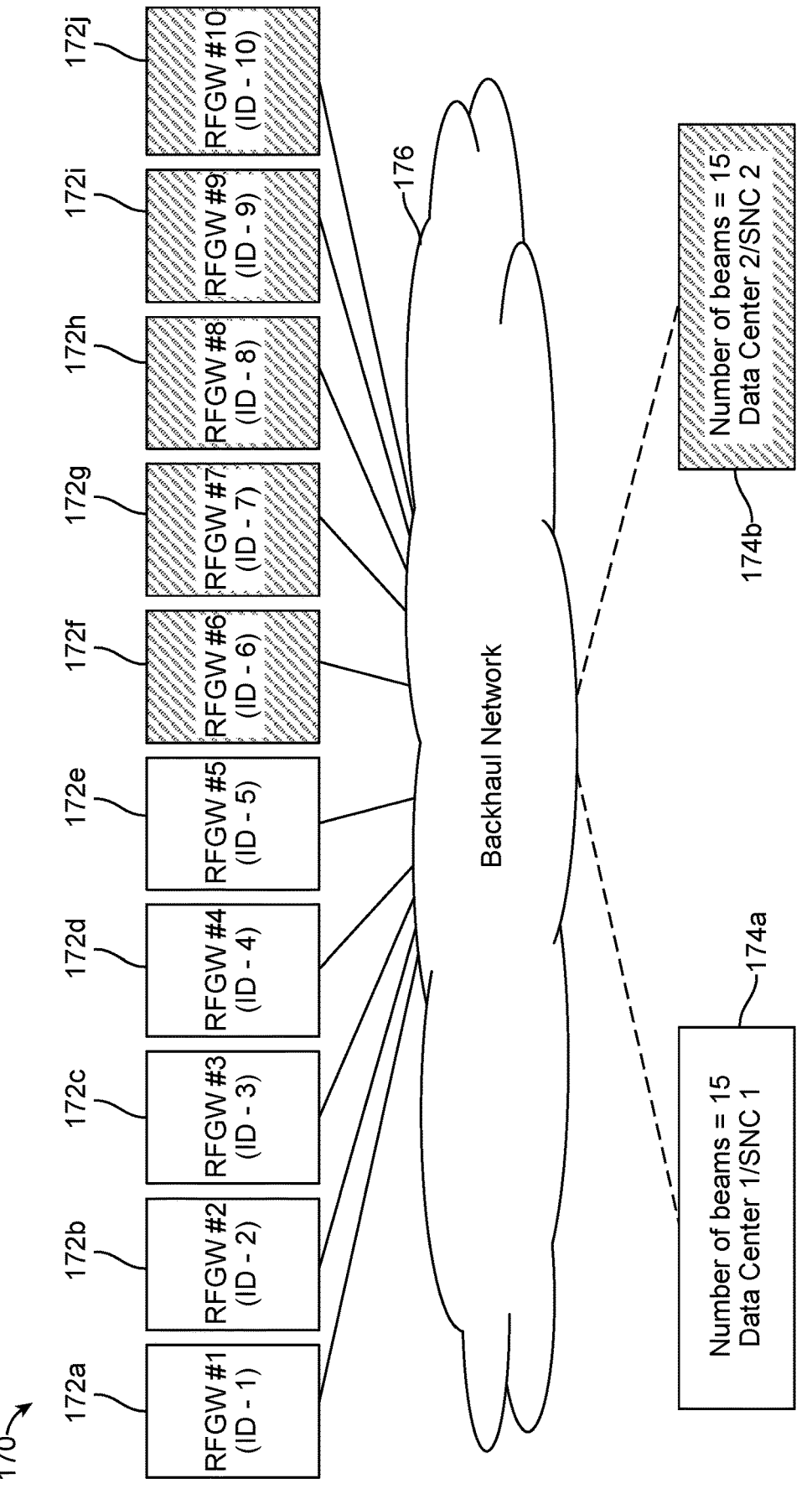
FIG. 1B is a diagram illustrating an example mapping among gateways and data centers or satellite network cores.

FIGS. 1A-1B show example network configurations in which each gateway is associated with a single data center or satellite network core at a time. Each gateway is assigned to send and receive data from a single data center or satellite network core, even though multiple gateways can be assigned to use the same data center or satellite network core.

FIG. 1A is a diagram showing an example of a network configuration 100 for satellite network service. The example shows a satellite 110, three terrestrial radiofrequency (RF) gateways 120a-120c (labeled RFGW 1 to RFGW 3), two data centers or satellite network cores (DC/SNCs) 130a-130b. The gateways 120a-120c communicate with their corresponding DC/SNCs 130a-130b over a backhaul network 105, which may include the Internet or other public or private networks. The satellite 110 provides four user beams (e.g., spot beams) 140a-140d to provide service to terminals 150, such as very small aperture terminals (VSATs). The terminals 150 communicate with the satellite 110 using five different frequency channels 160a-160e. The DC/SNCs 130a-130b provide, to the gateways 120a-120c, forward channel data to be transmitted over the satellite link to the terminals 150. The gateways 120a-120c also receive return channel data from the terminals over the satellite link and the gateways 120a-120c provide the return channel data to the DC/SNCs 130a-130b over the backhaul network 105.

In many conventional satellite networks, each gateway can serve multiple beams, but each beam is served by only one gateway at a time. The restriction is often imposed by the design and hardware capabilities of the satellite. By contrast, the example shown in FIG. 1A allows multiple gateways 120a-120c to serve one user beam simultaneously. As discussed further below, the more versatile mapping of beams among gateways can improve the efficiency of the system, allowing more fine-grained spectrum allocation so the full capacity of the gateways and the satellite 110 can be used. In addition, the system provides a more flexible or versatile mapping of beams among gateways, including dynamic reconfiguration of assignments, which can improve reliability and tolerance to failures, such as when handling gateway failures.

A reconfigurable satellite payload can be configured to allow multiple gateways to serve any user beam simultaneously. This automatically improves reliability of the network, as capacity on a beam can be split or shared by multiple gateways. When multiple gateways are used to serve a user beam, each gateway used transmits a separate forward carrier to the user beam (e.g., a separate transmission from gateway to the satellite 110). The transmissions for the user beam from different gateways may use the same gateway-to-satellite uplink frequency. Nevertheless, the transmissions for the user beam will use different user downlink frequencies (e.g., from the satellite 110 to the terminals 150). The return uplink frequency (e.g., for transmissions from the terminals 150 to the satellite 110) will be different for the carriers belonging to separate gateways.

The example of FIG. 1A shows the user beam 140d being served by multiple gateways simultaneously. For example, the gateway 120a (RFGW1) and the gateway 120b (RFGW2) are both shown serving the user beam 140d. The gateways 120a, 120b are also both associated with the same data center or DC/SNC 130a. For example, both gateways 120a, 120b receive data to transmit to the terminals 150 from the DC/SNC 130a, and both gateways 120a, 120b provide data received from the terminals 150 to the DC/SNC 130a.

Because the user beam 140d is served by both gateways 120a, 120b (RFGW1 and RFGW2), if either gateway 120a, 120b becomes unavailable, the other can take over. There are different options for making the change. One option is for terminals to switch to another outroute (e.g., outroute channel or outroute carrier) provided by a functioning gateway. For example, where the gateway 120a (RFGW1) and the gateway 120b (RFGW2) both provide portions of user beam 140d, if there is a failure for the gateway 120a (RFGW1), then then the terminals that were served by the first gateway 120a (RFGW1) using frequency channel 160a are switched to the frequency channel 160b, served by the second gateway 120b (RFGW2). For the user terminals that switched from to the second frequency channel 160b, the DC/SNC 130a sends the traffic for those terminals to the gateway 120b (RFGW2) for transmission.

Another option for handling failure of a gateway is to move the spectrum handled by the failed gateway to one or more other gateways. For example, if the gateway 120a fails, the spectrum chunk for frequency channel 160a can be allocated instead to the gateway 120b, so that the gateway 120b serves both frequency channels 160a, 160b of the user beam 140d. The DC/SNC 130a would then send the traffic for both frequency channels 160a, 160b to the gateway 120b. In other situations, the reassigned spectrum chunk of frequency channel 160a may be divided into multiple frequency channels and reassigned to potentially multiple different gateways.

A potential constraint of this configuration is that if one gateway fails, the user beams being served by that gateway have to be moved to gateways associated with the same DC/SNC in order to maintain the current traffic sessions. For example, although traffic from the gateway 120a can be moved to the gateway 120b (which shares the same DC/SNC 130a), traffic from the gateway 120a cannot be moved to gateway 120c (which communicates with a different DC/SNC 130b) without interrupting traffic sessions. To maintain traffic sessions, the system can be configured to re-route traffic among the set of gateways that share the same DC/SNC, and to avoid re-routing handling of beams that crosses DC/SNCs in a manner that would interrupt traffic sessions. Nevertheless, in some instances the maintenance of traffic sessions may not be required or may be secondary to other performance factors, and so moving traffic between gateways of different DC/SNCs may be permitted. For example, traffic from the user beam 140c could be moved from the gateway 120b to the gateway 120c, even though they have different DC/SNCs, if the maintenance of traffic sessions is not important.

FIG. 1B is a diagram illustrating an example mapping 170 among gateways 172a-172j and data centers or satellite network cores (DC/SNCs) 174a, 174b. As with FIG. 1A, each gateway can only be associated with a single DC/SNC, but multiple gateways can share the same DC/SNC. For example, the mapping relationship between gateways and DC/SNC is N:1. The gateways 172a-172j communicate with the data centers or satellite network cores (DC/SNCs) 174a-174b over a backhaul network 176.

In the example, five gateways 172a-172e are associated with DC/SNC 174a, and another five gateways 172f-172j are associated with the DC/SNC 174b. There are thus two groups in the mapping: the first group includes gateways 172a-172e (RFGW #1 to #5) mapped to DC/SNC 174a, and the second group includes gateways 172f-172j (RFGW #6 to #10) mapped to DC/SNC 174b.

In the event of a gateway failure, the spectrum or beams currently served by the failed gateway are moved to other remaining active gateways 172a-172j. When a user beam is associated with only one SNC/DC, the transfer of service for spectrum or beams of a failed gateway would need to be restricted within the same group of gateways associated with the same SNC/DC. For example, if the first gateway 120a (RFGW #1) fails, its spectrum can only be redistributed between gateways 120b-120e (RFGW #2 to RFGW #5) if a strict requirement to maintain existing traffic sessions is present. The traffic would only be able to be routed to one of the gateways 120f-120j (RFGWs #6 to #10) if the requirement for strict traffic session maintenance is removed. Since one user beam can be served by one DC/SNC, it is not possible for one portion of a beam is in one RFGW-DC/SNC group and the other portion of the beam is in another RFGW-DC/SNC group. In this case, traffic sessions will be maintained as the sessions are anchored in one DC/SNC.

FIGS. 2A-2D show example network configurations in which a single gateway may be associated with multiple data centers or satellite network cores simultaneously. When individual gateways are associated with multiple DCs/SNCs, spectrum from one gateway can be moved to any of the other gateways in the group sharing connections to the same DCs/SNCs while still keeping existing sessions (e.g., TCP sessions).

Figure 2A:
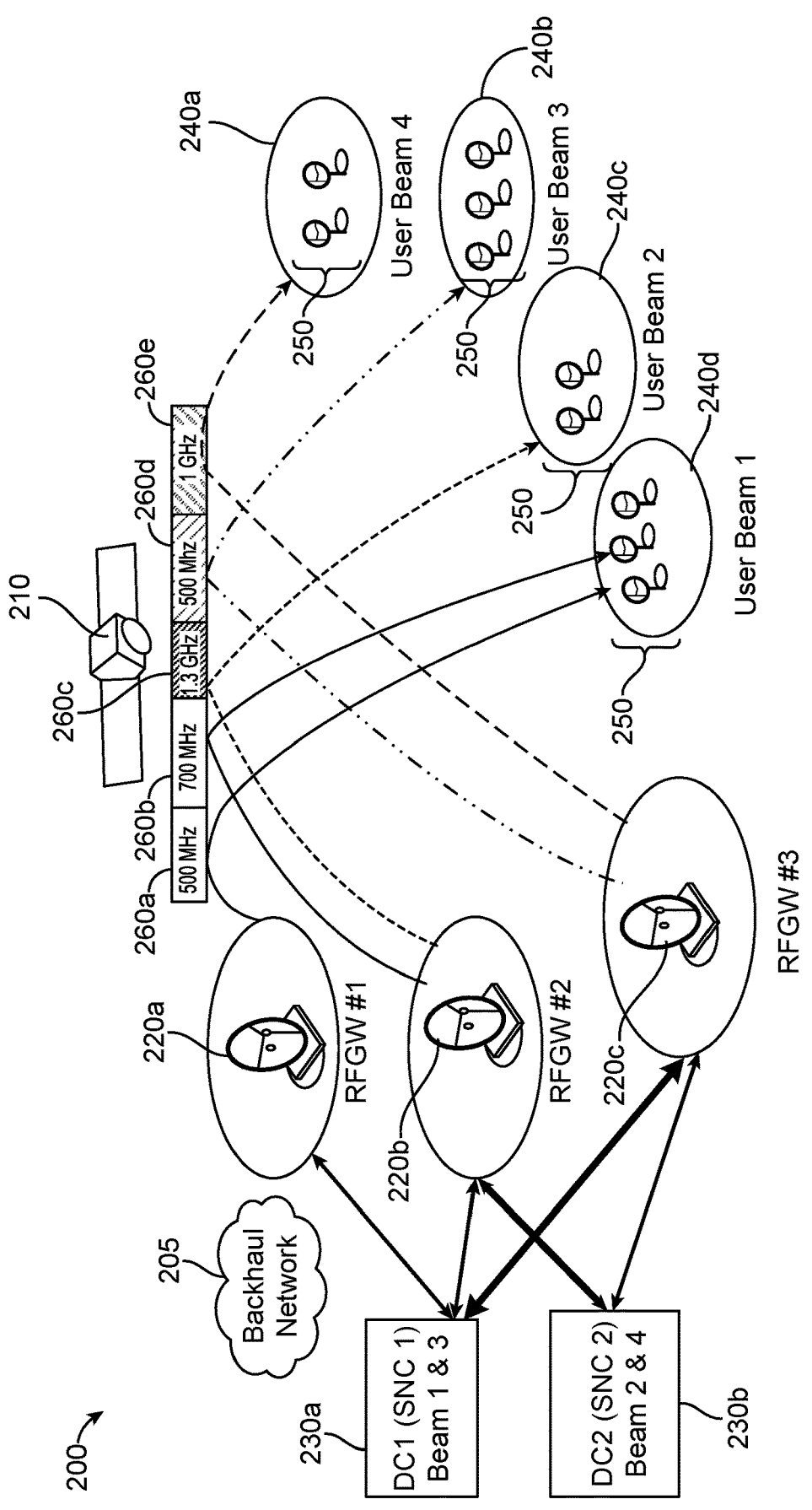
FIG. 2A is a diagram showing an example of another network configuration for satellite network service.

FIG. 2A is a diagram showing an example of another network configuration 200 for satellite network service. This arrangement permits a many-to-many mapping of DC/SNCs to gateways, as well as a many-to-many mapping of gateways to user beams.

The example shows a satellite 210, three terrestrial radio-frequency gateways 220a-220c (each abbreviated as "RFGW" in the figure), two data centers or satellite network cores (DC/SNCs) 230a-230b. The satellite 210 provides four user beams (e.g., spot beams) 240a-240d to provide service to terminals 250, such as very small aperture terminals (VSATs). The terminals 250 communicate with the satellite 210 using five different frequency channels 260a-260e.

In the network configuration 200 shown in FIG. 2A, each gateway 220a-220c can be served by one or more DC/SNCs 230a-230b and each user beam 240a-240d can be served by one or more gateways 220a-220c. This configuration is shown in FIG. 2A where the gateways 220b, 220c (RFGW2 and RFGW3) are served by both DC/SNC 230a and DC/SNC 230b. Because gateway 220b (RFGW2) is served by both DC/SNC 230a and DC/SNC 230b, if the gateway 220b becomes unavailable, the traffic can be moved to either or both of gateways 220a, 220c (RFGW1 and RFGW3) without changing the beam-to-DC/SNC mapping.

Figure 2B:
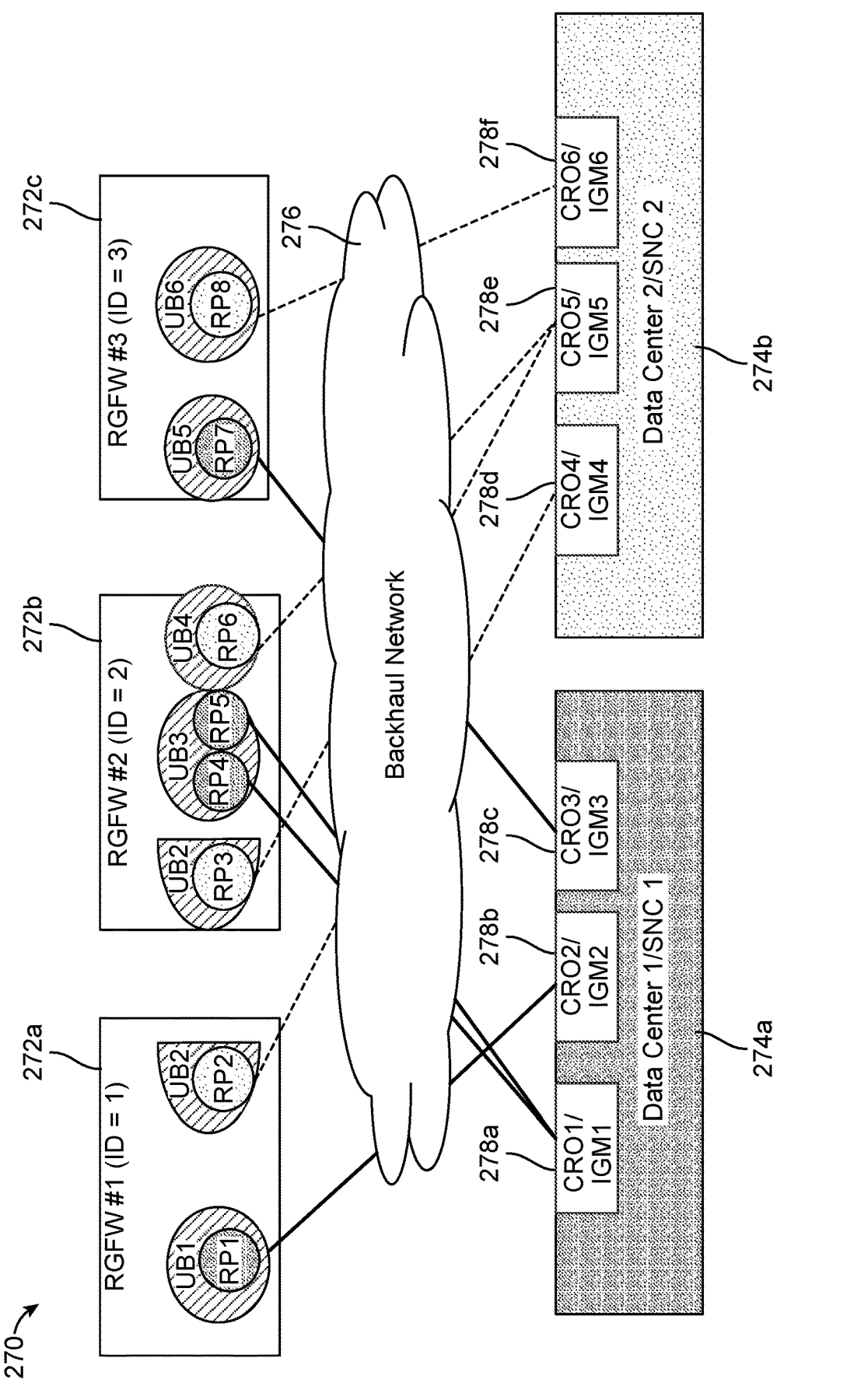
FIG. 2B is a diagram illustrating an example mapping among gateways, data centers or satellite network cores, and user beams for the second network configuration.

FIG. 2B is a diagram illustrating an example mapping of gateways, data centers or satellite network cores, and user beams. FIG. 2B shows an example topology at a particular point in time of network operation. Nevertheless, the versatility of the configuration allows the topology to change dynamically over time, such as to change the assignments of beams to gateways and/or the assignments of gateways to data DC/SNCs. The example shows two DC/SNCs 274a-274b, but the reconfigurable satellite payload system can typically support more than two DC/SNCs.

In general, the gateway-to-DC/SNC mapping is dynamic, with a many-to-many relationship (e.g., many gateways to many DC/SNCs). To facilitate management of satellite spectrum and bandwidth resources, a resource pool can be defined as a collection of outroute carriers with associated inroute carriers. Each resource pool is associated with only one gateway at a given time, so that a resource pool cannot be split between multiple gateways. The mapping can be dynamically changed during operation (e.g., while service is provided terminals) to support dynamic creation, deletion, and modification of resource pools.

In the example of FIG. 2B, there are three gateways 272a-272c and two DC/SNCs 274a-274b which communicate over a backhaul network 276. There are six user beams, labelled UB1-UB6, of a satellite. The assignment of user beams to gateways can be made so that a user beam can be split among multiple gateways. For example, user beam UB2 has a portion handled by gateway 272a and another portion handled by gateway 272b. There are eight resource pools RP1-RP8 defined for the gateways 272a-272c. As shown in FIG. 2B, when a beam is served using two different gateways, different resource pools are used in each gateway. For example, the portion of user beam UB2 served with gateway 272a is managed using resource pool RP2 and the portion of user beam UB2 served with gateway 272b is managed using resource pool RP3. In some cases, multiple resource pools may be used to handle a single beam within a gateway. For example, the gateway 272b uses resource pools RP4, RP5 to handle user beam UB3. In some cases, this can facilitate re-routing the portion of the user beam handled by one resource pool to another gateway. In other cases, the use of two resource pools may be a result of transferring handling of one portion of a beam from another gateway.

The DC/SNCs 274a-274b include multiple code rate organizers and inroute group managers (CRO/IGM), one for each user beam UB1-UB6. The code rate organizer (CRO) is an outroute transport component, and the inroute group manager (IGM) is an inroute transport component.

In the example, each of the DC/SNCs 274a-274b manages three user beams. In the example, each of the DC/SNCs 274a-274b has three CRO/IGM modules 278a-278f. When a beam is split to multiple gateways, different CROs and IGMs are needed as one CRO/IGM maps to a single gateway. Nevertheless, a single CRO/IGM can support multiple beams or multiple resource pools. For example, the CRO/IGM 278a is associated with two resource pools RP4 and RP5 of gateway 272b. As another example, the CRO/IGM 278e is associated with two resource pools RP3 and RP6 which are used for different beams (e.g., resource pool RP3 for beam UB2 and resource pool RP6 for beam UB4) but at the same gateway 272b. Thus, including three CRO/IGM modules for each DC/SNC allows each DC/SNC 274a-274d to work with each of the three gateways 272a-272c. The first DC/SNC 274a has a first CRO/IGM module 278a used for gateway 272b (e.g., with resource pools RP4 and RP5 for user beam UB3), a second CRO/IGM module 278b used for gateway 272a (e.g., resource pool RP1 and user beam UB1), and a third CRO/IGM module 278c used for gateway 272c (e.g., resource pool RP7 and user beam UB5). Similarly, the second DC/SNC 274b has a first CRO/IGM module 278d used for gateway 272a (e.g., resource pool RP2 and user beam UB2), a second CRO/IGM module 278e used for gateway 272b (e.g., resource pool RP3 and user beam UB2, as well as resource pool RP6 and user beam UB4), and a third CRO/IGM module 278f used for gateway 272c (e.g., resource pool RP8 and user beam UB6).

The terrestrial stations (e.g., gateways and DC/SNCs) can be adjusted to support many different network topologies, including with beams handled with a single gateway or with multiple gateways. In the configuration shown in the illustrated example, the user beam UB1 and its resource pool RP1, which is associated with DC/SNC 174a, is fully served by gateway 272a. On the other hand, the user beam UB2 is split between two gateways 272a, 272b, using two resource pools RP2, RP3 that are both associated with the DC/SNC 274b. The gateway 272a has resource pool RP2 and the gateway 272b has resource pool RP3, and they together service the user beam UB2.

Also in the illustrated example, the user beam UB3 is entirely served by the second gateway 272b with two resource pools RP4 and RP5, both of which are associated with the DC/SNC 274a. The user beams UB4 and UB5 are created from one geographic coverage physical user beam with separate resources and they physically overlap each other. The discussion further below will explain how multiple overlay beams can be created from one physical user beam for traffic management purposes. Because the overlay beams UB4 and UB5 are considered to be different beams in the system, even though the geographical coverage area can overlap, they can be assigned to two different DC/SNCs 174a, 174b. Lastly, the user beam UB6 is fed by the third gateway 272c alone and is associated with DC/SNC 274b.

Although the association of gateways and DC/SNCs is a many-to-many relationship, each modulator board at a gateway can be associated with only a single CRO process running on a compute server at one of the DC/SNCs in a 1:1 mapping. Similarly, each demodulator board at the gateway can be associated with only one IGM process running on a compute server at one of the DC/SNCs in a 1:1 mapping.

Various features can be provided to enable dynamic configuration and adjustment of satellite networks. For example, the techniques discussed herein can provide a satellite network ground system that allows the network to be dynamically configured to allow the frequency plan to be changed based on, for example, demand, availability of resources, and optimization of spectrum usage. Many conventional networks do not allow the frequency mapping between spot beams and gateways to be changed, whether in the forward path (e.g., sending data to user terminals) or the return path (e.g., for data transmitted by user terminals). The static mappings required by conventional systems often prevent the reorganization of spectrum across gateways and user beams, which causes inefficiencies as the spectrum often cannot be fully utilized in all conditions.

The techniques described further below include changes that can be made in various layers of network architecture, including characteristics of the physical layer, medium access control (MAC) layer, the satellite link control (SLC) layer, networking and application layers, can facilitate dynamic adjustment of frequency plans and assignments of beams and gateways. The present techniques can alter various communication protocol layers of a typical satellite communication ground system to support flexible payload operation. These layers can include the physical layer, the medium access control (MAC) layer, the satellite link control (SLC) layer, the networking layer, and the application layer. The present technique provides new methods in addressing those impacts for an end-to-end operation of a satellite network with a versatile reconfigurable satellite payload.

The physical layer characteristics of the system will be described first. For example, the waveforms for the physical layer can be provided according to the DVB-S2X standard on the forward outroute (TDM) and using Internet Protocol over satellite (IPoS) (e.g., multi-frequency time-division multiple access (MF-TDMA)) over the return inroute (e.g., inroute channel or inroute carrier). Physical layer changes do not have an impact on the type of waveform used on the respective links. The system can additionally or alternatively use digital video broadcasting—return channel via satellite (DVB-RCS) or a ground mobile radio (GMR) waveform.

Figure 3A:
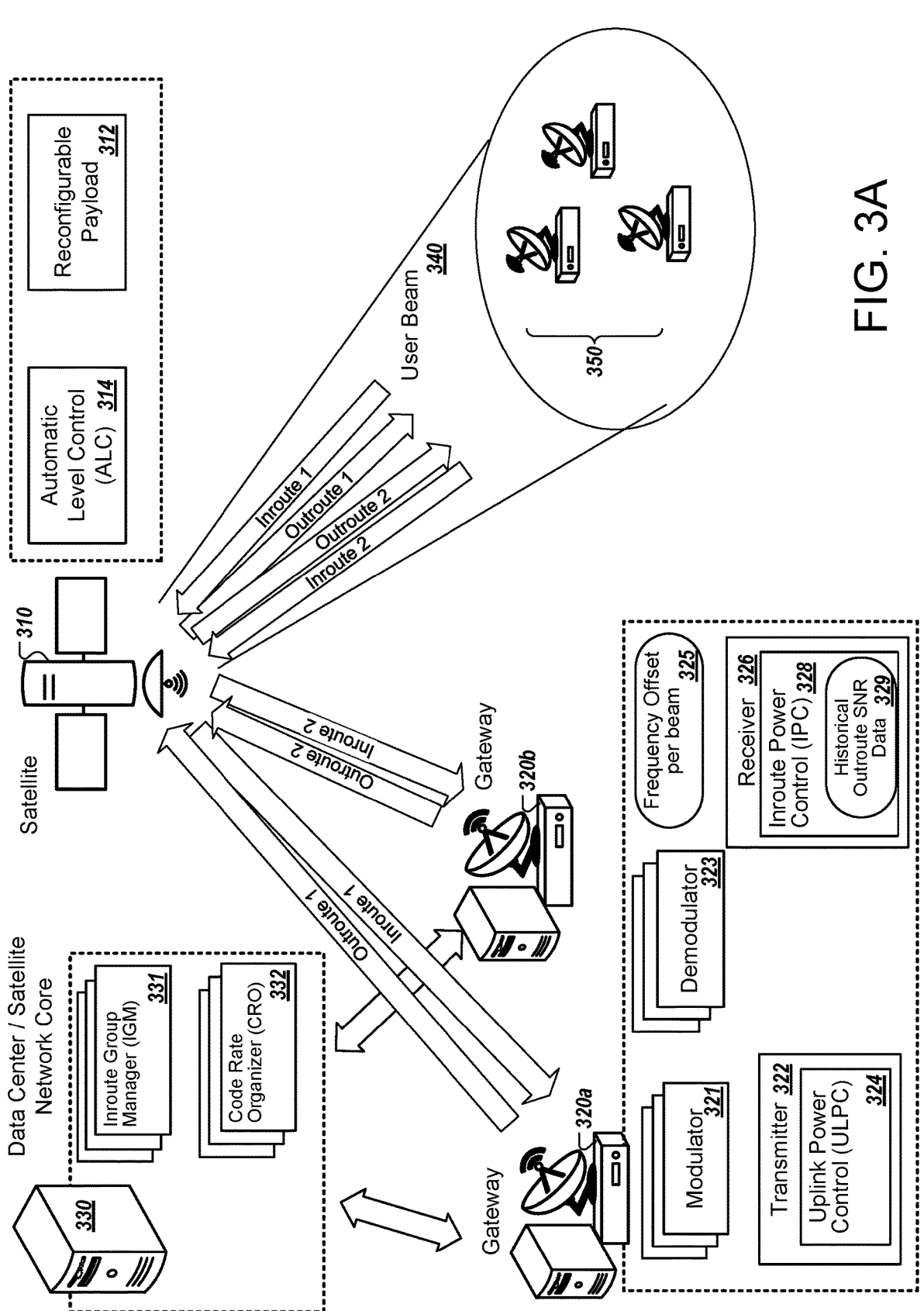
FIG. 3A is a diagram showing additional aspects of gateways and satellites in a satellite communication system.

FIG. 3A is a block diagram that shows examples of a power control techniques for a system with a reconfigurable satellite. The example shows a reconfigurable satellite 310 with a flexible or dynamically reconfigurable satellite payload 312 that supports reconfiguration of, for example, inroute carriers, reconfiguration of outroute carriers, splitting of beams among different gateways, adjustment to symbol rates for carriers, and other adjustments. The reconfigurable satellite 310 provides a user beam 340 to terminals 350. The example also includes one or more gateways 320 and one or more DC/SNCs 330. Each DC/SNC 330 can includes multiple inroute group manager (IGM) 331 processes and multiple code rate organizer (CRO) 332 processes. The features of the illustrated reconfigurable satellite 310, gateway 320, and DC/SNC 330 can be provided in the satellites, gateways, and DC/SNCs, respectively, that are illustrated in the other figures. In a typical system, as shown in other figures, satellite networking systems may have multiple satellites, gateways, and DC/SNCs that can operate as described with respect to FIG. 3A.

In general, the operation of a reconfigurable satellite 310 affects power control but does not otherwise have a strong impact on the physical layer. There are two separate aspects of power control on the gateway 320 for the outroutes. The first aspect involves maintaining the desired power output at the gateway's radiofrequency transmitter 322 to counter changing link conditions or other effects, so that the outroute signal-to-noise ratio (SNR) at the user beam 340 remains substantially constant. Depending on the satellite architecture, an automatic level control (ALC) 314 at the satellite's forward output also helps in this regard. However, if the satellite's input power from the gateway's radiofrequency transmitter 322 becomes too low, then the satellite's ALC functionality 314 cannot maintain the required output power, at which point the SNR at the user beam 340 changes. To maintain constant or near-constant input power at the input to the satellite 310, an uplink power control (ULPC) function 324 is implemented at the radiofrequency transmitter 322 of the gateway. The ULPC 324 changes the transmitter output power based on the inputs on the gateway-satellite link, such as the power of the downlink signal or measurements from a specific rain beacon.

The second aspect of power control relates to the balancing of output power across the gateways 320 of the system so that each gateway 320, when transmitting to a particular user beam 340, will attain the same SNR at the user beam 340. With the flexible payload system, this is important because multiple gateways 320 can serve one common beam 340, and terminals 350 may move among outroutes (e.g., Outroute 1 and Outroute 2) from different gateways 320 (e.g., gateway 320a and gateway 320b) for outroute load balancing and availability or diversity purposes. Although only one outroute is shown for each gateway 320, each gateway 320 may provide multiple outroutes, whether for a single beam or for multiple beams.

In a traditional satellite system (e.g., one without a flexible payload) one backup gateway may be provided to be able to take over the role of any of the primary gateways. In this arrangement, the system ensures that the backup gateway will be calibrated to be able to provide the correct level of output power to match the characteristics for every primary gateway for which it may need to take over service. This calibration is typically done manually by switching the backup gateway in for the primary gateway and measuring the signal quality factor (SQF) at the user beam and changing the transmit output power of the backup gateway until it achieves the same SNR achieved when the primary gateway was operating. This process is repeated for each of multiple outroutes in a user beam. This can be done to make the outroute's SNR equal between the primary gateway and the backup gateway, and also to equalize the SNR across all outroutes in a user beam.

When dynamic reconfiguration is performed (such as addition, deletion, resizing, merging of outroutes), maintaining the same SNR at the user terminal 350 for each of the outroutes can be very difficult or even impossible. This is because of the large number of variables impacting the outroute SNR, such as the uplink frequency of the outroute carrier, the downlink frequency of the outroute carrier, the system co-channel interference on the uplink and downlink frequency of the carrier, the gateway hardware, the satellite hardware, etc. The values or properties for each of these factors and components can change with every reconfiguration.

To make the process manageable, a new technique can remove the requirement of maintaining the SNR equal at the user terminal 350 across multiple outroutes from one gateway 320. The effect of this is that each outroute would have a slightly different total throughput across the beam 340 and hence after load balancing would end up supporting a different number of users. This does not affect the system performance or network sizing because the total combined throughput will remain the same for the user beam 340. The technique removes the complicated process of measuring the outroute SNR at health monitors across the network and feeding the measurements back to the gateways to balance (and keep balancing on an ongoing basis) the outroute SNR values.

density (PSD) units (dB/Hz). An example involving three gateways 320 is provided in Table 1 below. As shown in the table, Gateway 1 has two outroute carriers with 150 MHz and 100 MHz of bandwidth respectively. Gateway 2 and Gateway 3 each have only one outroute carrier. Gateway 3 has a lower PSD value for its carrier than Gateway 1, but total output power is the same (e.g., 74 dBW) because Gateway 3 is transmitting on twice the bandwidth as Gateway 1. Gateway 2 has the same PSD as Gateway 1, but overall Gateway 2 transmits more power (76 dBW) as it transmits using a higher bandwidth carrier. The PSD values depend on the optimization of various parameters of the system. The total gateway power will have to be lower than the maximum output power of the high-power amplifier in the transmitter of the gateway. This PSD value is then converted by the system to obtain a corresponding value to set the modulator transmit power accordingly.

TABLE 1

| Example Gateway RFT output power | | | | | |
| --- | --- | --- | --- | --- | --- |
| Gateway # | Outroute ID | Transmit Bandwidth (MHz) | PSD dB/Hz (set by external configuration) | Carrier output | Total Gateway power |
| 1 | 1 | 150 | −10 | −10 + 10*log10(150e6) = 71.7 dBW | 74 dBW |
| 1 | 2 | 100 | −10 | −10 + 10*log10(100e6) = 73 dBW | |
| 2 | 1 | 400 | −10 | −10 + 10*log10(400e6) = 76 dBW | 76 dbW |
| 3 | 1 | 500 | −13 | −13 + 10*log10(500e6) = 74 dBW | 74 dBW |

Another effect of unbalanced SNR outroutes in a user beam 340 is that when a terminal 350 switches between two outroutes, the inroute power control adjusts its power due to the change in outroute SNR. Because the inroute SNR has not been affected, this might result in the inroute SNR being too low at the receiver 326 of the gateway 320 and transmitted data bursts might be missed. To avoid this, the inroute power control 328 stores historical outroute SNR data 329, which includes a record of the long-term SNR of each of the outroutes. When a switch is made from a first outroute to a different outroute, the inroute power control 328 will reset the current long-term SNR of the switched-in outroute with the corresponding outroute's long-term SNR.

In flexible or reconfigurable payload operation, beams and associated outroutes can be moved from one gateway 320 to another in the system. When these changes among gateways 320 occur, it may become difficult or impossible to balance their resulting SNR levels across the gateways 320 because the gateways 320 might have different hardware characteristics and capabilities (e.g., different antenna sizes, different amplifiers). The output power could be very different between two gateways 320 if they are not properly configured, and a large difference in output power may result in reduced performance after a switchover to another gateway 320.

To better balance the power output among gateways when reconfiguration and switching may occur, the system attempts to maximize the total network performance at any given time, and does so by considering the difference in power between the gateways 320. The radiofrequency transmitters 322 are configured at the gateway 320 based on a power level for each outroute carrier set in power spectral Due to the frequency slope of the cables and the amplifiers etc. in the radiofrequency transmitter 322 of a gateway 320, the output power should be balanced across frequency. Otherwise outroutes at one end of the output spectrum will have a very different output power than the outroute at the other end of the spectrum even with all other parameters being the same.

Another technique can be performed to achieve power balancing over a frequency range. The balancing is typically done by measuring the difference across a frequency range when the system starts up. To capture this calibration result, at the time of radiofrequency transmitter 322 commissioning (or any time), measurement components can be placed in the path from the modulator 321 to the radiofrequency transmitter 322. Several types of data are gathered and loaded on gateway: a radiofrequency transmitter input frequency (e.g., a value or range in MHz), a path identifier, and an output power for the gateway (e.g., specified in dBm/kHz or dBm/MHz depending on desired accuracy and desired speed of calibration data collection activity). With this information, depending on where the carrier lies on the radiofrequency transmitter spectrum and the size of the carrier, the gateway 320 can compute power that achieves radiofrequency flatness. In other words, the gateway 320 can compute settings to equalize the transmitted power level and achieve an even or consistent response over the relevant frequency range. A gateway component that computes carrier power this way can determine total carrier power by accumulating the values of a function over a range (e.g., determine the area under a curve, such as a curve representing response at different frequencies over a contiguous range of frequencies) or by adding discrete addition of points involved, including potentially appropriate interpolation at the edges.

On the return channel (e.g., inroute), a demodulator 323 in the gateway 320 normally averages the frequency offset from all terminals 350 to track the frequency offset arising from the imperfections in satellite frequency conversion and any doppler effects in the system due to satellite movement. In a system with a dynamically reconfigurable satellite payload 312, a single demodulator 323 can span multiple beams 340, and now the demodulator 323 needs to record a different average value of frequency offset 325 for each beam 340 that is being served, because the offset will be different for different user beams 340. In the reconfigurable payload architecture, each individual band (e.g., each continuous frequency chunk) can be routed via different paths in the reconfigurable satellite 310. The averaging of frequency offset information will thus occur at the granularity of individual bands and not at a beam level.

Figure 3B:
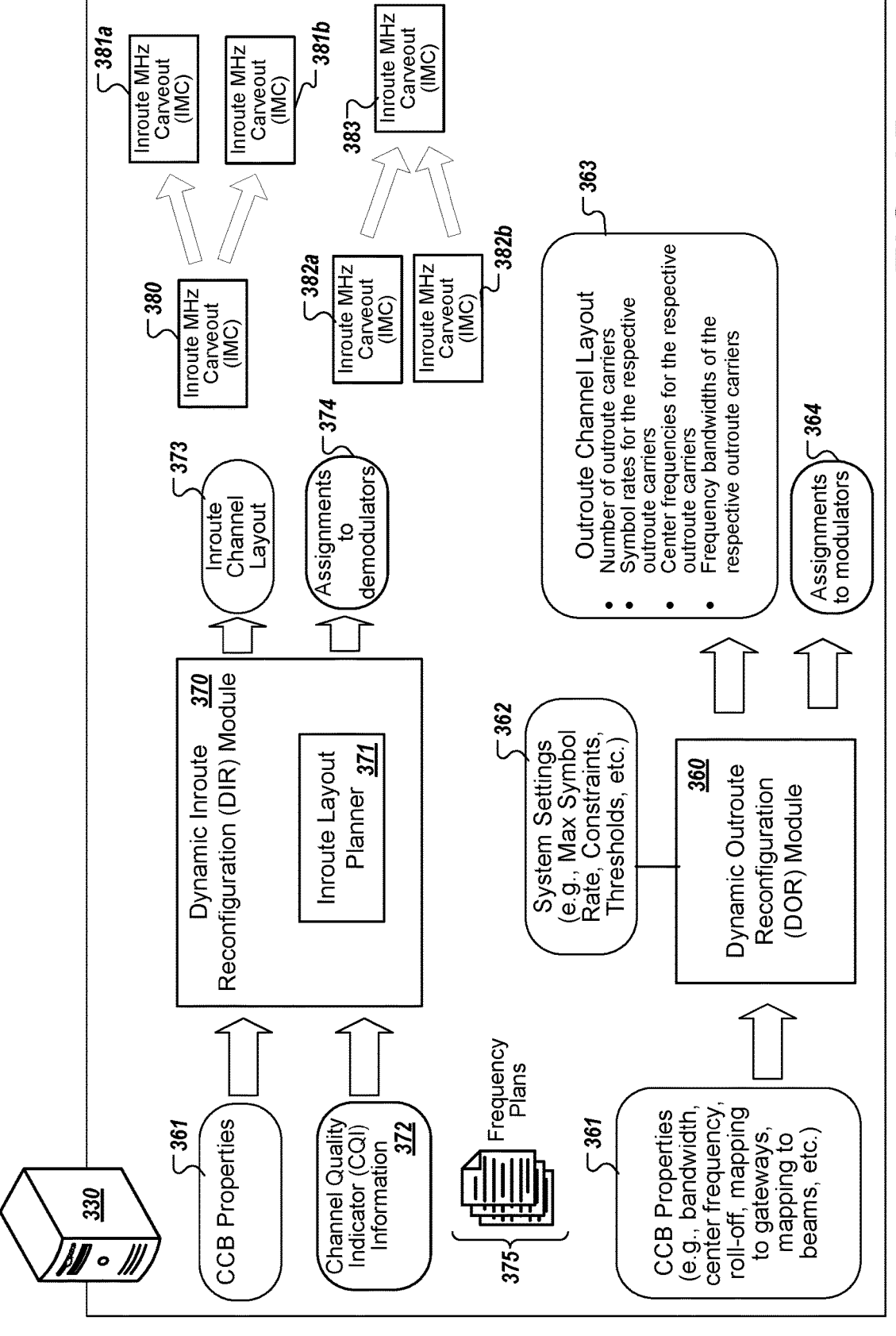
FIG. 3B is a diagram that shows features of dynamic outroute reconfiguration and dynamic inroute reconfiguration.

FIG. 3B is a block diagram that illustrates additional techniques to support a reconfiguration of inroutes and outroutes using a reconfigurable satellite 310. The system can include various changes and enhancements for the satellite link control/media access control layer (SLC/MAC) to support reconfigurable satellite payloads 312. Due to the reconfigurable capabilities of the reconfigurable satellite 310, the system needs to be able to change outroute carriers and bandwidth dynamically. The system can use the following logic to address the dynamic change of carriers.

The system can perform dynamic outroute reconfiguration (DOR) process 360 to find the configuration for the deployment of outroutes (e.g., digital video broadcasting—satellite—second generation extensions (DVB-S2X) outroutes) from a particular spectrum chunk or contiguous chunk bandwidth (CCB) and certain associated parameters. The DOR process 360 is typically performed at the DC/SNC 330. The DOR process 360 is applied to each forward link CCB individually. The other tasks performed by the DOR process 360 include determining the modulators 321 (e.g., specific modulator board(s) in a gateway 320) where these outroutes would need to be assigned and mapping those outroutes to the correct hardware ports. The modulator assignments 364 (e.g., assignment of outroutes or outroute groups to modulators 321 and/or ports) can thus be an output of the DOR process 360. One CCB belonging to a beam 340 is associated with one DC/SNC 330 at a given time, and the CCB is also assigned to one modulator board. Therefore, outroutes generated from a CCB are assigned to the modulator(s) 321 of a gateway 320 that are mapped to the DC/SNC 330 of the CCB.

The input parameters (and their units) to the DOR process 360 are:

1. CCB Bandwidth, $CCB_{BW}$ (in MHz)
2. Forward Uplink CCB center satellite frequency, $CCBF_{C_{Fu}}$ (in MHz) a. GW to Satellite—Forward uplink,
3. Forward Downlink CCB center satellite frequency, $CCBF_{C_{Fd}}$ (in MHz)
    a. Satellite to user terminal—Forward downlink
4. The Nyquist filter roll-off for carriers in CCB, $CCB_{rolloff}$ (in %)
    a. The range is typically in the range from 5% to 35%
    b. $CCB_{rolloff}$ used in the algorithm will be the value in % expressed as a decimal number.
       i. 5% will become 0.05

5. Setting specifying whether to create one carrier alone in CCB, $CCB_{SingleCarrier}$ (Boolean)
    a. Even though the algorithm is designed to minimize the number of outroutes in the CCB, it is possible that the algorithm creates multiple carriers to cover the full spectrum. This particular option will create just one carrier even if the spectrum is available to create more.
6. Minimum symbol rate supported by the system, $SymbRate_{min}$ (in Msps)
7. Maximum symbol rate supported by the hardware, $SymbRate_{max}$ (in Msps)
8. Symbol Rate resolution ($SymbRate_{resolution}$) (log 10 (ksps) units)
    a. E.g., 0=1 ksps, 1=10 ksps, 2=100 ksps, 3=1000 ksps or 1 Msps.
9. Carrier center frequency resolution PrecCenterFreq (log 10 (ksps) units)
    a. E.g., 0=1 ksps, 1=10 ksps, 2=100 ksps, 3=1000 ksps or 1 Msps.
10. Allowable Bandwidth Reduction percentage, RedPercent (as %)
    a. This is the maximum allowable reduction before a single, larger symbol rate carrier will be split into 2 smaller symbol rate carriers to cover more spectrum. The same applies for splitting 2 carriers in to 3 and so on.
    b. Default value of this is zero, e.g., 0%.
    c. The reduction is defined as a percentage of the CCB bandwidth. A 5% reduction in CCB bandwidth of 500 MHz is 25 MHz. A corresponding 25 Msps reduction will be the maximum allowed.

Values of the first 5 parameters (e.g., CCB Bandwidth, Forward Uplink CCB center satellite frequency, Forward Downlink CCB center satellite frequency, the Nyquist filter roll-off for carriers in CCB, and setting to create 1 carrier alone in CCB) are specified for each CCB. These are represented in FIG. 3A as CCB properties 361. By contrast, values of parameters 6-10 (e.g., minimum symbol rate supported, maximum symbol rate supported, symbol rate resolution, carrier center frequency resolution, allowable bandwidth reduction percentage) remain constant for all CCBs. These are represented in FIG. 3A as system settings 362. In certain cases, the input may specify one CCB for one outroute carrier along with a specific roll-off factor. In this case, the DOR process 360 creates one outroute carrier from the CCB bandwidth using the specified roll-off factor. If rolloff is not specified, then the system wide default roll-off factor is used by the DOR process 360. This feature can be availed by setting the $CCB_{SingleCarrier}$ to True.

Modulator hardware capabilities and terminal hardware capabilities (e.g., based upon terminal hardware types in the given user beam) are taken into consideration to determine the maximum symbol rate of the system. For example, a particular model of terminals may have a limitation of a maximum of 200 Msps symbol rate, and the gateway hardware may support a higher rate, such as 450 Msps. When that model of terminal is deployed in a flexible payload network, the gateway can be limited to use a maximum symbol rate of 200 Msps due to the limited capability of some terminals present, even though the gateway hardware can support a higher data rate of 450 Msps for the outroute carrier.

The output of the DOR process 360 typically includes the following:

1. A number of outroutes
2. The symbol rate (in Msps) for each of the outroutes
3. The over-the-air center frequency for each of the outroutes. This can include an uplink frequency (e.g., for the gateway-to-satellite link) and a downlink frequency (e.g., for the satellite-to-user-terminal link)

The carriers are specified as a set of center frequency and symbol rate. The center frequency is typically the center of the occupied bandwidth, so if center frequency is represented by variable $f_C$ and occupied bandwidth is represented by variable ob, then the range of frequencies the carrier occupies will be [$f_C$-ob/2, $f_C$-Fob/2]. The symbol rate can be specified in megasymbols per second, such as with a whole integer or optionally fractional Msps if supported. The occupied bandwidth can be defined as the bandwidth beyond which the energy of the carrier falls substantially low so as not to interfere with the adjacent carrier. For a DVB-S2× linearly amplified carrier, this is equivalent to the carrier's symbol rate plus symbol rate times the roll-off of the pulse shaping filter (a).

The $CCB_{rolloff}$ used in the algorithm is the value in % expressed as a decimal number.

$$ob=(1+CCB_{Rollof})*\text{SymbRate}$$

The outroute carrier configuration can be done using the following rules and constraints:

1. A predetermined minimum number of outroute carriers is set to occupy the given spectrum
   a. This is because larger symbol rate carriers provide better statistical multiplexing gain
   b. Lower number of carriers helps the satellite travelling wave tube amplifier (TWTA) to be backed off less
   c. Lower number of carriers help keep the frequency spacing loss at a minimum
2. Occupied bandwidth of the carrier(s) should be less or equal to the bandwidth of the CCB $$a.\ CCB_{BW} >= \sum_{i=1}^{N} obCarriere_i$$

3. The symbol rates of the outroutes should be similar to each other (e.g.,
   a. This reduces the small signal suppression through the satellite TWTA
4. The channel spacing between the carriers can be set to be the minimum required to support the occupied bandwidth of both carriers.
   a. The spacing between carriers (i), and (i+1) can be calculated as:

spacing =

$$(1 + CCB_{rolloff}) * \frac{SymbolRate_i}{2} + (1 + CCB_{rolloff}) * \frac{SymbolRate_{(i+1)}}{2}$$

The DOR process 360 algorithm can be implemented in two parts or sections. The first part includes an algorithm that calculates the number of carriers and the symbol rates that each of the carriers will have. The second part includes an algorithm that calculates the satellite forward uplink and downlink center frequencies for each of the carriers that have been specified from the first algorithm.

Techniques for determining the number of carriers and their symbol rates will now be described. Radiofrequency filters are present on the forward path of the satellite to extract the appropriate beam's signal from the signal coming from the gateway, which is aimed for multiple beams. Each of these filters has a passband bandwidth where the gain and delay have a small ripple. This passband bandwidth of the filter in the path is where the carrier energy should be placed and shall be assumed to be $CCB_{BW}/(1+CCB_{rolloff})$. The passband bandwidth of the carrier(s) shall always be within the passband bandwidth of the CCB. For a linear DVB-S2X carrier, the passband bandwidth is the 3 dB bandwidth or the symbol rate of the carrier. The roll-off of the carriers should not exceed the total bandwidth of the CCB, $CCB_{BW}$. In other words, the system accounts for roll-off (e.g., transition region between passband and stopband) of the carriers due to the filter characteristics used, so that combination of passband and roll-off for the carriers is within the full CCB bandwidth.

The first step is to check if the passband of the $CCB_{BW}$ is greater than the minimum symbol rate $SymbRate_{min}$. If it is lower, then the algorithm will exit with an error. The error indicates that the bandwidth available is not sufficient to support a minimum symbol rate, $SymbRate_{min}$ set for the system.

$$BW = \frac{CCB_{BW}}{1 + CCB_{rolloff}}$$

$$\text{If } \frac{CCB_{BW}}{1 + CCB_{rolloff}} < SymbRate_{min},$$

If $CCB_{SingleCarrier}$ is set to True, then the number of carriers, $N_C$, to define in the CCB is 1, and the algorithm will calculate the highest symbol rate possible for a single carrier that can be fit in the passband of the CCB. The symbol rate, SymbRate, that is selected for the carrier must be less than or equal to the maximum symbol rate supported by the system hardware, $SymbRate_{max}$:

$$\text{If } CCB_{SingleCarrier} = \text{True} \qquad\qquad \text{Equation 1}$$

$$Nc = 1;$$

and $$SymbRate = rounddownn\left(\max\left(\frac{CCB_{BW}}{1 + CCB_{rolloff}},\ SymbRate_{max}\right),\right.$$

$$\left. DigitsSymbRate_{resolution}\right)$$

In the equation, the precision of the rounding operation is set by a value of $DigitsSymbRate_{resolution}$' where $DigitsSymbRate_{resolution}=\{3,2,1,0\}$ for $SymbRate_{resolution}=\{0,1,2,3\}$ respectively.

If neither of the above two conditions are satisfied (e.g., when the CCB passband is not too small to support the minimum symbol rate, and the number of carriers is not required to be 1), the algorithm enters the third portion where the general calculation of the parameters is done using the constraints and rules defined above. A minimum number of carriers are required to cover the full spectrum and larger symbol rate carriers are preferred hence a symbol rate closest to the maximum symbol rate possible shall be used. If $N_C$ is the number of carriers with maximum symbol rate and the carrier energy should be in the passband of the CCB, then the following equation holds:

$$Nc * SymbRate_{max} + (Nc - 1) * SymbRate_{max} * CCB_{rolloff} \leq \frac{CCB_{BW}}{1 + CCB_{rolloff}}$$

This equation suggests that the energy of the carrier(s) will be in the passband of the CCB, however the roll-off of the carriers in the lower and upper end of the passband can use the roll-off of the CCB itself.

An number of carriers, $N_C$, can be calculated as:

$$Nc = \left\lceil \frac{\dfrac{CCB_{BW}}{1 + CCB_{rolloff}} + SymbRate_{max} * CCB_{rolloff}}{SymbRate_{max} * (1 + CCB_{rolloff})} \right\rceil \qquad \text{Equation 2}$$

The result determined in Equation 2 the number of carriers that can be used given the maximum symbol rate supported and the bandwidth characteristics (e.g., total bandwidth and roll-off characteristics) for the CCB. In other words, the result is often a decimal or fraction that indicates the number of carriers that the CCB can support at the maximum symbol rate. The result can be rounded to an integer number of carriers. In some cases, it is preferable to round up to maximize the total throughput provided over the set of carriers. If the value of $N_C$ is rounded down, then each of the carriers can operate at the maximum symbol rate, but the omitted fractional portion of $N_C$ represents capacity of the CCB that would not be usable. In other words, through-put in this scenario is constrained by the maximum symbol rate to less than the CCB bandwidth can support. On the other hand, by rounding $N_C$ up, the carriers would have a symbol rate lower than the maximum supported in the system, but using a greater number of carriers at less than the maximum symbol rate can provide the highest overall throughput for the CCB bandwidth, as throughput is not constrained by the maximum symbol rate. This relationship holds while carriers in the CCB all use the same symbol rate, but other options including carriers with different symbol rates are discussed below.

The symbol rate of each carrier (1, 2, . . . , $N_C$) will be less than the maximum symbol rate if the integer value of $N_C$ is greater than the decimal value of $N_C$ calculated above. The symbol rate of the carrier can be calculated as:

$$SymbRate = rounddown\left( \frac{\dfrac{CCB_{BW}}{1 + CCB_{rolloff}}}{Nc * (1 + CCB_{rolloff}) - CCB_{rolloff}}, \right. \\ \left. DigitsSymbRate_{resolution} \right) \qquad \text{Equation 3}$$

This formula can be used if the resolution of the carrier symbol rate is 100s of ksps or higher. If the resolution is 100 ksps, then the loss in spectrum could be up to $N_c*100$ ksps for that CCB. The precision for the symbol rate, SymbRate, per carrier can be set by a value of $DigitsSymbRate_{resolution}$, which in turn is set by a value representing the desired level of resolution $SymbRate_{resolution}$, that sets the level of resolution (e.g., digits of precision) for setting the symbol rate:

$DigitsSymbRate_{resolution}=\{3,2,1\}$ for $SymbRate_{resolution}=\{0,1,2\}$ respectively If $SymbRate_{resolution}$ is set to 3 and the resolution is 1 Msps, then rounding down can lead up to $N_c*1$ Msps of loss which can be excessive and unfavorable. To mitigate that, two different symbol rates can be used.

If the symbol rate can only be integers of Msps, then the system can set two symbol rates deployed, $S_H$ and $S_L$. These two symbol rates represent both a high symbol rate, $S_H$, which is the symbol rate rounded up to the nearest integer number of Msps, and a low symbol rate, $S_L$, which is the symbol rate rounded down to the nearest integer number of Msps:

$$S_H = integer\left( \frac{\dfrac{CCB_{BW}}{1 + CCB_{rolloff}}}{Nc * (1 + CCB_{rolloff}) - CCB_{rolloff}} \right) + 1 \qquad \text{Equation 4}$$

And $$S_L = integer\left( \frac{\dfrac{CCB_{BW}}{1 + CCB_{rolloff}}}{Nc * (1 + CCB_{rolloff}) - CCB_{rolloff}} \right) \qquad \text{Equation 5}$$

The number of outroutes with the lower symbol rate $S_L$ is given by NsL, which is determined using a ceiling function to round up to the nearest integer with the equation below:

$$N_{S_L} = ceil\left\{ S_H - S_H\left[ \left( \frac{\dfrac{CCB_{BW}}{1 + CCB_{rolloff}} + S_H * CCB_{rolloff}}{S_H * (1 + CCB_{rollof})} \right) - \\ int\left( \frac{\dfrac{CCB_{BW}}{1 + CCB_{rolloff}} + S_H * CCB_{rolloff}}{S_H * (1 + CCB_{rolloff})} \right) \right] \right\} \qquad \text{Equation 6}$$

The number of outroutes with the higher symbol rate $S_H$ is given by $N_{S_H}$, which is determined by subtracting the number of outroutes $N_{S_L}$ that use the lower symbol rate $S_H$ from the total number of carriers, $N_C$:

$$\text{and } N_{S_H}=N_C-N_{S_L} \qquad \text{Equation 7}$$

Sometimes it is not beneficial to split the given CCB into multiple carriers. Splitting into multiple carriers introduces a loss due to factors such as:

a. Channel spacing between the carriers,
b. Satellite TWTA extra backoff, and/or
c. Larger symbol rate carriers providing better statistical multiplexing gain A single large carrier can be more beneficial for systems that require a higher service plan offering. For example, a single 235 Msps carrier in a 250 MHz bandwidth is more beneficial than putting two 119 Msps carriers, even though the total bandwidth utilized in the latter is higher at 238 Msps. When the number of carriers, $N_C$, is calculated, it is rounded up and the number of carriers increased by 1 and the symbol rate reduced (by taking the ceiling function of $N_C$). As a result, the maximum number of carriers with the maximum symbol rate, $SymbRate_{max}$, is $N_C-1$. The following rule shall be applied to check if the splitting (e.g., rounding up instead of rounding down for the integer number of carriers) is beneficial or not.

$$\text{IF } \sum_{i=1}^{Nc} SymbRate_i - (N_c - 1) * SymbRate_{max} < \qquad \text{Equation 8}$$

-continued $$\frac{RedPercent}{100} * CCB_{BW}, \text{ then}$$

$SymbRate = SymbRate_{max}$ and number of carriers, $N_c = N_c - 1$

RedPercent is the maximum Msps reduction percentage that can be tolerated before selecting lower symbol rate carriers becomes favorable. This value can be chosen in any of the following ways:

a. A default value of zero to make sure that the splitting doesn't lead to a loss in Msps at the expense of covering the whole CCB spectrum. This loss is usually due to the channel spacing.

b. A statistical multiplexing gain analysis can lead to a value other than 0.

c. A recommended configuration is provided if the default value is not valid for the deployed system The following examples illustrate the algorithm with different inputs and outputs. The case when the passband BW of the CCB<$SymbRate_{min}$ and the case when $CCB_{SingleCarrier}$=True are considered straightforward and not illustrated here.

Example 1: CCB Passband BW<$SymbRate_{max}$

If $CCB_{BW} = 100$ MHz, $CCB_{rolloff} = 0.05$ and $SymbRate_{max} = 235$ $Msps$, then $$Nc = \left\lceil \frac{95.23809 + 11.75}{235 * (1.05)} \right\rceil = 1$$

With $SymbRate_{resolution} = 10$ $ksps$, $$SymbRate = rounddown\left( \frac{95.23809}{1(1 + 0.05) - 0.05}, 2 \right) = 95.23 \ Msps$$

If $SymbRate_{resolution} = 1000$ $ksps$, or 1 $Msps$ $S_H = 96$ $S_L = 95$ $$N_{S_L} = \text{ceil}\left\{ 96 - 96\left[ \left( \frac{95.238 + 96 * 0.05}{(1 + 0.05) * 96} \right) - \text{int}\left( \frac{95.238 + 96 * 0.05}{(1 + 0.05) * 96} \right) \right] \right\} = 1$$

$$N_{S_H} = N_C - N_{S_L} = 1 - 1 = 0$$

The DOR output for Example 1 thus specifies a single carrier with a symbol rate of 1 Msps.

Example 2: CCB Passband BW=$SymbRate_{max}$

If $CCB_{BW} = 250$ MHz, $CCB_{rolloff} = 0.05$ and $SymbRate_{max} = 238.1$ $Msps$, then $$Nc = \left\lceil \frac{238.095 + 0.05 * 238.1}{238.1 * (1 + 0.05)} \right\rceil = 1$$

With $SymbRate_{resolution} = 1$ $ksps$, $$SymbRate = rounddown\left( \frac{238.095}{1 * (1.05) - 0.05}, 1 \right) = 238.095 \ Msps$$

If $SymbRate_{resolution} = 1000$ $ksps$, or 1 $Msps$

-continued $S_H = 239$ $Msps$ $S_L = 238$ $Msps$ $$N_{S_L} =$$
$$\text{ceil}\left\{ 239 - 239\left[ \left( \frac{238.095 + 239 * 0.05}{(1 + 0.05) * 239} \right) - \text{int}\left( \left( \frac{238.095 + 239 * 0.05}{(1 + 0.05) * 239} \right) \right) \right] \right\} = 1$$

$$N_{S_H} = N_C - N_{S_L} = 1 - 1 = 0$$

The DOR output for Example 2 thus specifies a single carrier with a symbol rate of 1 Msps.

Example 3: CCB Passband BW=$SymbRate_{max}$

If $CCB_{BW} = 50$ MHz, $CCB_{rolloff} = 0.1$ and $SymbRate_{max} = 12$ $Msps$, then $$Nc = \left\lceil \frac{45.4545 + 12 * 0.1}{12 * (1 + 0.1)} \right\rceil = 4$$

With $SymbRate_{resolution} = 1000$ $ksps$, or 1$Msps$ $S_H = 11$ $Msps$ $S_L = 10$ $Msps$ $$N_{S_L} = \text{ceil}\left\{ 11 - 11\left[ \left( \frac{45.4545 + 11 * 0.1}{(1 + 0.1) * 11} \right) - \text{int}\left( \frac{45.4545 + 11 * 0.1}{(1 + 0.1) * 11} \right) \right] \right\} = 2$$

$$N_{S_H} = N_C - N_{S_L} = 4 - 2 = 2$$

Here, there will be two carriers with symbol rate 11 Msps and two carriers with symbol rate 10 Msps. From Equation 8, we have (11+11+10+10)−(3)*12=6 which is >0.05*50=2.5, if RedPercent=5% and as a result the carriers will remain the same. The DOR output for Example 3 thus specifies four carriers, two with a symbol rate of 11 Msps each and two with a symbol rate of 10 Msps each.

Example 4: CCB Passband BW>$SymbRate_{max}$ and $N_C$>1

If $CCB_{BW} = 520$ MHz, $CCB_{rolloff} = 0.05$ and $SymbRate_{max} = 235$ $Msps$, then $$Nc = \left\lceil \frac{495.238 + 235 * 0.05}{235 * (1 + 0.05)} \right\rceil = 3$$

With $SymbRate_{resolution} = 100$ $ksps$, $$SymbRate = rounddown\left( \frac{459.238}{3 * (1 + 0.05) - 0.05}, 1 \right) = 159.7 \ Msps$$

From Equation 8, we have (3*159.7)−(2)*235=9.25 which is <0.05*520= 26Msps, if RedPercent=5%

Hence the carriers will be changed, $N_C$=3−1=2; and SymbRate=$SymbRate_{max}$=235

The DOR output for Example 4 thus specifies two carriers operating at the maximum symbol rate of 235 Msps.

Example 5: CCB Passband BW>SymbRate$_{max}$

If $CCB_{BW} = 500$ MHz, $CCB_{rolloff} = 0.05$ and $SymbRate_{max} = 470$ $Msps$, then $$Nc = \left\lceil \frac{476.19 + 470*0.05}{470*(1+0.05)} \right\rceil = 2$$

With $SymbRate_{resolution} = 100$ $ksps$, $$SymbRate = rounddown\left(\frac{476.19}{2*(1+0.05)-0.05}, 1\right) = 232.2 \ Msps$$

From Equation 8, we have (2*232.2)–(1)*470=–5.6 which is <0 Msps, if Red-
Percent=0% (default)

This is a loss in BW due to the spacing between the two 232 Msps carriers. Hence the carriers will be changed, $N_C$=2–1=1; and SymbRate=SymbRate$_{max}$=470 Msps The DOR output for Example 5 thus specifies a single carrier with a symbol rate of 470 Msps.

Techniques for finding the center frequencies for carriers will now be discussed. Once the number of carriers and each of their symbol rates is found, the center frequencies for each of the carriers can be found by using the layout rules. The layout of the carriers is done from lower to higher frequencies. The CCB has a center frequency for both uplink and downlink and similarly each carrier will have a center frequency in both the uplink and downlink directions. All calculations will be rounded down to a preferred number of digits of precision, set by variable DigitsPrecCenterFreq. This value can be set bases on an array of values such that DigitsPrecCenterFreq={3,2,1,0} for PrecCenterFreq={0,1,2,3} respectively. The resolution of the carrier center frequency is in terms of 1 ksps, so default value of DigitsPrecCenterFreq=3.

If there is only one carrier in the CCB, then the center frequency will be the center frequency of the CCB, represented as $CCBF_{C_{Fu}}$ in the uplink and $CCBF_{C_{Fd}}$ in the downlink.

If $N_C$=1; $f_{C_1}up$=CCBF$_{C_{Fu}}$ and $f_{C_1}dn$=CCBF$_{C_{Fd}}$

If there is more than 1 carrier in the CCB, then system will find the center frequency for each carrier sequentially. If the lower end of the CCB bandwidth starts at $f_{start}$, then the first carrier center frequency is at $f_{C_1}$=$f_{start}$+SymbRate$_1$*(1+CCB$_{rolloff}$)/2

Where SymbRate$_1$ is the symbol rate of the first carrier and $f_{C_1}$ is the center frequency of the lowest frequency carrier, $$fstart = CCBFc_{Fu} - \frac{CCB_{BW}}{2}$$

in the forward uplink and $$fstart = CCBFc_{Fd} - \frac{CCB_{BW}}{2}$$

in the forward downlink.

So, in the forward uplink direction:

$$fc_1up = \qquad\qquad\qquad\qquad\qquad\qquad \text{Equation 9}$$
$$rounddown\left(CCBF_{Fu} - \frac{CCB_{BW}}{2} + SymbRate_1 * \frac{1+CCB_{rolloff}}{2},\right.$$
$$\left. DigitsPrecCenterFreq\right)$$

and in the forward downlink direction:

$$fc_1dn = \qquad\qquad\qquad\qquad\qquad\qquad \text{Equation 10}$$
$$rounddown\left(CCBFc_{Fd} - \frac{CCB_{BW}}{2} + SymbRate_1 * \frac{1+CCB_{rolloff}}{2},\right.$$
$$\left. DigitsPrecCenterFreq\right)$$

The second carrier shall be placed at frequency $f_{C_2}up$ on the uplink and $f_{C_2}dn$ on the downlink with SymbRate$_2$ being the symbol rate for the second carrier giving $$fc_2up = rounddown\left(fc_1up + SymbRate_1 * \frac{1+CCB_{rolloff}}{2} + \right. \qquad \text{Equation 11}$$
$$\left. SymbRate_2 * \frac{1+CCB_{rolloff}}{2}, DigitsPrecCenterFreq\right)$$

$$fc_2dn = rounddown\left(fc_1dn + SymbRate_1 * \frac{1+CCB_{rolloff}}{2} + \right. \qquad \text{Equation 12}$$
$$\left. SymbRate_2 * \frac{1+CCB_{rolloff}}{2}, DigitsPrecCenterFreq\right)$$

And the rest of the carriers shall be placed according to the same formula $$fc_pup = \qquad\qquad\qquad\qquad\qquad\qquad \text{Equation 13}$$
$$rounddown\left(fc_{(p-1)}up + SymbRate_{(p-1)} * \frac{1+CCB_{rolloff}}{2} + \right.$$
$$\left. SymbRate_p * \frac{1+CCB_{rolloff}}{2}, DigitsPrecCenterFreq\right)$$

$$fc_pdn = \qquad\qquad\qquad\qquad\qquad\qquad \text{Equation 14}$$
$$rounddown\left(fc_{(p-1)}dn + SymbRate_{(p-1)} * \frac{1+CCB_{rolloff}}{2} + \right.$$
$$\left. SymbRate_p * \frac{1+CCB_{rolloff}}{2}, DigitsPrecCenterFreq\right)$$

Various examples of determining center frequencies will now be described.

For Example 1 above, if CCBF$_{C_{Fu}}$=28500 Mhz and CCBF$_{C_{Fd}}$=19450 MHz then $N_C$=1 so $f_{C_1}up$=CCBF$_{C_{Fu}}$=28500 MHz and
$f_C$1dn=CCBF$_{C_{Fd}}$=19450 MHz Example 2 also had a single carrier and so would have the same center frequency determined.

For Example 3 above, there are 4 carriers with symbol rates 11 Msps, 11 Msps, 10 Msps, and 10 Msps, respectively. If CCBF$_{C_{Fu}}$=28500 Mhz and CCBF$_{C_{Fd}}$=19450 MHz then $$fc_1up = 28500 - \frac{50}{2} + 11 * \frac{1+0.1}{2} = 28481.05 \text{ MHz}$$

-continued

And $$fc_1 dn = 19450 - \frac{50}{2} + 11 * \frac{1 + 0.1}{2} = 19431.05 \text{ MHz}$$

$$fc_2 up = 28481.1 + 11 * \left(\frac{1.1}{2}\right) + 11 * \frac{1.1}{2} = 28493.15 \text{ MHz}$$

$$fc_2 dn = 19431.1 + 11 * \frac{1.1}{2} + 11 * \frac{1.1}{2} = 19443.15 \text{ MHz}$$

$$fc_3 up = 28493.2 + 11 * \left(\frac{1.1}{2}\right) + 10 * \frac{1.1}{2} = 28504.7 \text{ MHz}$$

$$fc_3 dn = 19443.2 + 11 * \frac{1.1}{2} + 10 * \frac{1.1}{2} = 19454.7 \text{ MHz}$$

$$fc_4 up = 28504.7 + 10 * \left(\frac{1.1}{2}\right) + 10 * \frac{1.1}{2} = 28515.7 \text{ MHz}$$

$$fc_4 dn = 19454.7 + 10 * \frac{1.1}{2} + 10 * \frac{1.1}{2} = 19465.7 \text{ MHz}$$

The set of carrier parameters for Example 3 can be stored as a table shown here in Table 2.

TABLE 2

| DOR output for Example 3 | | | | |
|---|---|---|---|---|
| | Carrier 1 | Carrier 2 | Carrier 3 | Carrier 4 |
| Symbol rate (Msps) | 11 | 11 | 10 | 10 |
| Fc Dn (Mhz) | 19431.05 | 19443.15 | 19454.7 | 19465.7 |
| Fc Up (MHz) | 28481.05 | 28493.15 | 28504.7 | 28515.7 |

For Example 4 above, if $CCBF_{C_{Fu}} = 28500$ Mhz and $CCBF_{C_{Fd}} = 19450$ MHz then $$fc_1 up = 28500 - \frac{520}{2} + 235 * \frac{1 + 0.05}{2} = 28363.375 \text{ MHz}$$

And $$fc_1 dn = 19450 - \frac{520}{2} + 235 * \frac{1 + 0.05}{2} = 19313.375 \text{ MHz}$$

$$fc_2 up = 28363.375 + 235 * (1.05) = 28610.125$$

$$fc_2 dn = 19313.375 + 235 * 1.05 = 19560.125$$

TABLE 3

| DOR output for Example 4 | | |
|---|---|---|
| | Carrier 1 | Carrier 2 |
| Symbol rate (Msps) | 235 | 235 |
| Fc Dn (Mhz) | 19313.375 | 19560.125 |
| Fc Up (MHz) | 28363.375 | 28610.125 |

For Example 5 above, there is only a single carrier, and so the center frequencies for the uplink and downlink can be determined as discussed above for Example 1.

When a beam is split across multiple gateways 320 in flexible payload operation, the original spectrum in the beam 340 is divided into multiple smaller chunks, with one chunk per gateway 320. Splitting a beam across multiple gateways 320 may result divided chunks ending up in several different return link traffic processors and resource managers. The dynamic inroute configuration (DIR) module 370 creates inroutes from each of the spectrum chunks assigned to multiple gateways 320 by splitting a user beam 340. The DIR process 370 can be performed at the DC/SNC 330. The DIR process 370 can be applied to each return link CCB individually.

Analogous to the way the DOR process 360 performs outroute configuration, the dynamic inroute reconfiguration (DIR) module 370 determines an inroute layout that can be repeatedly changed in a flexible payload system. Various enhancements specific to a satellite's flexible payload can be captured in the inroute reconfiguration process. The DIR 370 creates inroutes and inroute groups (or instead adds inroutes to or deleting inroutes from existing configured inroute groups) and assigns them to appropriate demodulators 323 and IGMs 331 by keeping 1:1 mapping construct between demodulators 323 and IGMs 331. Individual inroute carriers are moved around IGMs 331 in the same DC/SNC 330 when a beam 340 is fractioned to multiple gateways 320. The properties of carriers can be redefined by the DIR 370 when carriers are moved around IGMs 331 (and demodulator boards of demodulators 323), especially when a portion of the spectrum of a user beam 340 is moved. For example, one existing carrier can be split into two, two carriers can be merged into one, or a roll-off factor can be changed.

The output of the DIR 370 can be an inroute channel layout 373 or inroute channel composition, which specifies the channels to be used for inroute communications. The inroute channel layout 373 can specify properties such as the number of inroute channels, and the center frequencies and bandwidths of each inroute channel. The mapping of CCBs and beams to gateways can be specified in a frequency plan 375 that is used as a input to the DIR 370. The DC/SNC 330 can store multiple frequency plans 375 that represent alternative plans for mapping spectrum resources and beams among gateways (e.g., with different frequency plans 375 respectively showing assignments of spectrum and beams among different sets of gateways, among different numbers of gateways, etc.). The frequency plans 375 can thus specify the assignments of CCBs and/or IMCs (which are portions of CCBs) to beams and/or gateways. The DIR 370 then specifies the inroute channels or inroute carriers (often referred to simply as "inroutes") to be used in the different spectrum resources.

For example, the DIR 370 can receive CCB properties 361 and CQI information 372, along with information about a selected frequency plan 375 to be used. The DIR 370 then divides each CCB into IMCs, and divides each IMC into specific inroutes. For example, if a CCB has a bandwidth of 50 MHz, the DIR 370 may divide the CCB into two IMCs of 20 MHz and 30 MHz, respectively. Each IMC can be divided into inroute channels, such as the 20 MHz channel being divided into two 4 MHz channels, three 2 MHz channels, and six 1 MHz channels. The other 30 MHz channel can also be divided into inroute channels.

The frequency plans 375 can be created or entered by an administrator for the system, and different frequency plans can represent different configurations (e.g., alternative configurations), often corresponding to different situations. One frequency plan 375 may represent a nominal case in which each gateway is operating normally, another frequency plan 375 can represent a case in which a particular gateway fails, another frequency plan 375 can represent a case in which a different gateway fails, and so on. The administrator for the network may manually select a frequency plan 375 to use or manually initiate a change from one frequency plan 375 to another. In response, the DC/SNC 330 can use the DIR 370 to update the inroute channel layout 373 and demodulator assignments 374 that assign IMCs (and potentially specific inroutes or groups of inroutes) to demodulators 323 accordingly.

In some implementations, the DC/SNC 330 stores rules or other criteria for selecting which frequency plan 375 to use, so that the DC/SNC 330 can automatically select or change which frequency plan 375 to use. For example, one of the frequency plans 375 can be designated to be used if a particular gateway fails. The DC/SNC 330 can monitor the status of the gateways associated with it, and if the particular gateway fails or otherwise becomes unavailable, the DC/SNC 330 can detect this and automatically switch to the plan corresponding to that failure scenario. As another example, different frequency plans 375 can be designated for different load levels or load distribution conditions, and the frequency plans 375 can be switched to perform load balancing. As a result, the DC/SNC 330 can automatically switch among different frequency plans 375 to adapt to changing conditions, and can then carry out the changes needed to achieve the appropriate beam and gateway mappings of the selected frequency plan 375. This can include using the DIR 370 to generate a new inroute channel layout 373 and/or using the DOR 360 to generate a new outroute channel layout 363. In some implementations, the selection of frequency plans and/or monitoring of the status of gateways or the network as a whole may be performed by a separate management system (e.g., a server system), which can instruct the DC/SNCs in the network which frequency plans 375 to use and can instruct a switch from one frequency plan 375 to another.

In some cases, the inroute spectrum moved to a gateway 320 can be assigned to one demodulator board or multiple demodulator boards based on the specific situation. When assigned to multiple demodulators 323, multiple inroute MHz carveouts (IMCs) 381*a*-381*b* can be created from a single IMC 380. When one CCB can be assigned to a single demodulator, the IMC is simply the CCB. If a CCB cannot be assigned to a single demodulator, then the CCB is divided into multiple IMCs. Each IMC needs at least one inroute set. In other words, the number of IMCs resulting from a split is equal to the number of demodulators 323 over which a CCB is split. Note that one IMC cannot span multiple demodulators, a separate IMC is used for each demodulator. Each split IMC is assigned to one IGM 331 at the DC/SNC 330 (see FIG. 3A). In other cases, the DIR 370 may merge two IMCs 382*a*-382*b* into a single resulting IMC 383.

One of the functions of the DIR 370 is to determine which demodulator(s) 323 should be assigned the spectrum chunk(s) specified in a frequency plan 375 in such a way to meet all of the applicable constraints of the system. Thus, the output of the DIR 370 includes assignments 374 of IMCs to demodulators 323. The constraints include that one IMC needs to fit in one demodulator, and multiple IMCs across gateways 320 from one beam 340 would need to go to one DC/SNC 330. As noted above, one inroute MHz carveout (IMC) does not span multiple demodulators 323.

When a CCB does not fit into any of the demodulator boards 323 that are associated with the required DC/SNC 330, the DIR 370 divides the CCB into multiple IMCs and assigns them to multiple demodulators 323.

When the system switches between frequency plans 375, the initial inroute layout planner 371 of DIR 370 makes use of the available terminals' channel quality indicator (CQI) values and demands that belong to the particular IMC after the switch. This is mostly true for cases of real-time switching used typically for gateway failure handling.

In certain reconfigurable scenarios, such as gateway growth (e.g., adding a new gateway) or other non-real-time changes, it is not possible for the DIR 370 to obtain the true CQI information 372 and demand from terminals at the startup of the frequency plan 375. In such a case, the system starts with the statically-configured symbol rates mix with the percentage of bandwidth distribution.

Various changes to support reconfigurability can also be made at the network layer and application layer. For example, various features of the network and application layers are related to supporting flexible reconfigurable satellite payload. These include various network topologies, network layer design of gateway redundancy, virtual satellite network operator (VNO) bandwidth management, outroute load balancing, traffic QoS of terminals, data center redundancy, beam capacity redistribution and end to end traffic flow in various reconfiguration scenarios. The techniques ensure minimum or no packet loss, maintaining TCP connections during payload reconfiguration in certain events such as predictive gateway switchover, and outroute load balancing where outroutes in the load balancing set are served from different gateways.

In general, network topology is not fixed for a flexible payload very high throughput satellite (VHTS) system as spectrum is moved across gateway feeder links (e.g., links from the gateway to the satellite). A few exemplary scenarios are included to illustrate the new features that can be implemented at the network layer. A centralized architecture can be used, where gateways are distributed across various locations in a remote light-out operation (called a gateway) and they are connected to a data center (DC) or Satellite Network Core (SNC) via a backhaul network. The gateway hosts modulation and demodulation functions, and the DC/SNC location provides transport and network functions along with connectivity to the Internet or an enterprise network.

There are two network topology options being looked at that depends on how gateways and DC/SNCs are mapped with each other. In one topology, gateways and DC/SNCs assume a mesh type of mapping in which any gateway can talk to any DC/SNC and vice-versa. In another scenario, each gateway can be associated with only one DC/SNC at a time and one DC/SNC can serve multiple gateways in a N:1 mapping from gateways to a DC/SNC.

As discussed further below, DC/SNCs and/or another server system assisting management of the satellite network can perform a method to carry out reconfiguration of the satellite network. Changes made to the configuration of a network can be instructed or indicated by a management system, one or more DC/SNCs, gateways, or a combination or subcombination of them. The method can be performed by one or more computers and can include managing, by the one or more computers, a satellite communication network to operate in a first configuration. The satellite communication network can include a satellite having a payload that enables dynamic reconfiguration of carriers within a beam. The satellite communication network can include (i) multiple data centers or satellite network cores and (ii) multiple gateways. The first configuration can include a set of carriers for beams of the satellite and an assignment of the carriers to the gateways. The method can include detecting, by the one or more computers, a reconfiguration event while the satellite communication network is operating in the first configuration. The method can include, in response to detecting the reconfiguration event, determining, by the one or more computers, a second configuration for the satellite communication network. The second configuration differs from the first configuration in at least one of a set of carriers used for the beams or an assignment of the carriers to the gateways. The method can include managing, by the one or more computers, the satellite communication network to operate in the second configuration, including at least one of (i) changing to a second set of carriers for the beams of the satellite or (ii) changing to a second assignment of the carriers to the gateways.

In the method the reconfiguration event can be an event or condition that signals that reconfiguration is appropriate or needed. In other words, the reconfiguration event can be an event that, when detected, triggers or initiates a reconfiguration process. The reconfiguration event may be as user input from an administrator or another system that instructs a reconfiguration to occur. A reconfiguration event can also be the detection of a certain condition of the network, such as a particular operating state or other type of network status, that signals that reconfiguration is needed. A predetermined set of events or conditions can be defined in advance as reconfiguration events that, when the occur or are detected, cause the reconfiguration to occur. These events and conditions can include, for example, one or more of: the failure of a gateway or a portion of a gateway (such as a modulator, a demodulator, etc.); a change in available spectrum resources (e.g., an increase or decrease in the size or amount of CCBs available); a change in the number or arrangement of satellite beams; a change in the association of gateways with DC/SNCs; a change in the number of gateways available (e.g., adding a gateway, removing a gateway, etc.); a change in load conditions (e.g., leading to reconfiguration for load balancing among beams or gateways); a change in wireless channel conditions (e.g., a change in rain fade, interference, etc.); a change in frequency plan 375 used, whether selected automatically by the system or instructed by a user; or detection by the system of a configuration that would provide greater efficiency or reliability. These examples of reconfiguration events that can prompt the system to perform reconfiguration are intended to illustrate types of events that can lead to reconfiguration and are not intended to be exhaustive.

The system has the versatility to make a variety of changes to a network configuration, as discussed herein. For example, as part of the reconfiguration (e.g., changing from a first configuration to a second configuration), the system may make changes that include, for example, at least one of: (1) reassigning a channel, IMC, or CCB, for example, (i) from one modulator or demodulator to another in the same gateway, (ii) from one gateway to another gateway, and/or (iii) from one user beam to another user beam; (2) re-sizing or moving a channel, IMC, or CCB, such as by increasing or decreasing its bandwidth, and potentially adjusting the size of other channels, IMCs, or CCBs to accommodate the change; (3) splitting a channel, IMC, or CCB; (4) merging two or more channels, IMCs, or other portions of a CCB; (5) transferring, splitting, or merging components of a beam; or (6) transferring terminals from one inroute to another and/or from one outroute to another. These examples of reconfiguration are intended to illustrate types of reconfiguration that can be performed are not intended to be exhaustive. Various examples of these reconfigurations are described throughout the application and in the various figures.

In some implementations, the method can include associating each of the multiple gateways to each of the multiple data centers or satellite network cores to enable redundancy to permit assignment of a spectrum chunk among the multiple gateways.

As an example, detecting the reconfiguration event can include detecting a change to remove at least a portion of a first gateway in the satellite communication network. This may occur due to a failure, due to maintenance, or for other reasons. The second configuration can include a reassignment of one or more carriers served by the first gateway to one or more second gateways in the satellite communication network.

As another example, detecting the reconfiguration event can include detecting a change to add an additional gateway to the satellite communication network. The second configuration can include a reassignment of one or more carriers served by the gateways of the satellite communication network to the additional gateway.

As another example, detecting the reconfiguration event can include detecting a change to a spectrum allocation for a beam or gateway of the satellite communication network. Compared to the first configuration, the second configuration can include a change, for one or more of the carriers in a beam of the first configuration, to at least one of: a number of carriers in the beam; a bandwidth of one or more carriers in the beam; a center frequency of one or more carriers in the beam; or a symbol rate of one or more carriers in the beam.

As another example, detecting the reconfiguration event can include detecting an unequal distribution of traffic or carriers among gateways of the satellite communication network. The second configuration can include a reassignment of one or more carriers served by a first gateway of the satellite communication network to one or more of the other gateways of the satellite communication network.

Managing the satellite communication network to operate in the second configuration can include causing two or more of the gateways in the satellite communication network to serve different carriers of a same beam of the satellite. This may represent a change where the beam was served by a single gateway in the first configuration, but is split among multiple gateways in the second configuration.

In some implementations, a first group of the gateways are associated with a first data center or satellite network core (DC/SNC), and a second group of gateways are associated with a second DC/SNC. Managing the satellite network to operate in the second configuration can include transferring one or more carriers of a particular beam, wherein the one or more carriers are transferred from a particular gateway that is associated with the first DC/SNC to another gateway determined to be associated with the first DC/SNC, such that user traffic sessions are maintained after transferring the one or more carriers.

In some implementations, determining the second configuration for the satellite communication network can include performing a dynamic outroute reconfiguration process that can include determining, for a forward link spectrum chunk at least one of: a number of outroute carriers; a symbol rate for each of the outroute carriers; a center frequency for each of the outroute carriers; or a bandwidth for each of the outroute carriers. The dynamic outroute reconfiguration process can include: determining the number of outroute carriers based on a bandwidth of the spectrum chunk, a measure of frequency roll-off, and a maximum symbol rate per outroute carrier; and determining the symbol rates determined based on the bandwidth of the spectrum chunk, the measure of frequency roll-off, and the determined number of outroute carriers.

In some implementations, the dynamic outroute reconfiguration process can include: defining an outroute channel layout for the outroute carriers including (i) defining frequency characteristics for a first outroute carrier based on a boundary of the spectrum chunk, a symbol rate assigned for the first outroute carrier, and a measure of frequency roll-off, and (ii) after defining the frequency characteristics for the first outroute carrier, defining frequency characteristics for one or more additional outroute carriers based on a bandwidth of the first outroute carrier; and assigning the outroute carriers to one or more of the gateways in the satellite communication network.

In some implementations, the dynamic outroute reconfiguration process can include determining an assignment of outroute carriers to modulators of the gateways and mapping the outroute carriers to corresponding hardware ports in the gateways.

In some implementations, determining the second configuration for the satellite communication network can include performing a dynamic inroute reconfiguration process that can include determining, for a return link spectrum chunk at least one of: a number of inroute carriers; center frequencies for the inroute carriers; or bandwidths for the outroute carriers.

In some implementations, determining the second configuration for the satellite communication network can include performing a dynamic inroute reconfiguration process that can include: at least one of creating one or more inroute carriers, creating one or more inroute carrier groups, or adjusting one or more inroute carrier groups to add or remove an inroute carrier; and assigning inroute carriers or inroute carrier groups to demodulators of the gateways and inroute group managers of the data centers or satellite network cores.

In some implementations, performing the dynamic inroute reconfiguration process can include at least one of: creating one or more inroute carriers from a spectrum chunk assigned to one or more of the gateways in the satellite network; changing an assignment of inroute carriers to inroute group managers; redefining properties of one or more inroute carriers when moving an inroute carrier to a different inroute group manager or to a different demodulator; spitting an inroute carrier into multiple inroute carriers; and merging two or more inroute carriers into a single inroute carrier.

Referring again to FIG. 2B, the example of FIG. 2B shows a mesh-type mapping of gateways 272a-272c and DC/SNCs 274a-274b. As discussed above, FIG. 2B illustrates an example mapping among gateways 272a-272c, DC/SNCs 274a-274b, and user beams UB1-UB6.

The gateway-to-DC/SNC mapping is dynamic, with a potential many-to-many relationship. There is a one-to-one mapping between a user beam and DC/SNC and typically is static, but in some scenarios a user beam can move from one SNC to another. One such example is when SNC redundancy occurs. A user beam cannot be split between multiple SNCs. A resource pool (RP) is a collection of outroute carriers with associated inroute carriers from contiguous chunk bandwidth (CCB) is always associated with only one gateway at a given time, meaning a resource pool cannot be split between multiple gateways.

If the first gateway 272a is lost, e.g., either in a predictive or corrective gateway backup scenario, a spectrum or frequency plan reconfiguration takes place by distributing user beam UB1 (with its resource pool RP1) and the portion of user beam UB2 (with resource pool RP2) that was handled by the first gateway 272a, into multiple remaining active gateways 272b, 272c as one active gateway may not have the sufficient backup feeder link spectrum to take over the full capacity of the failed gateway 272a.

Figure 2C:
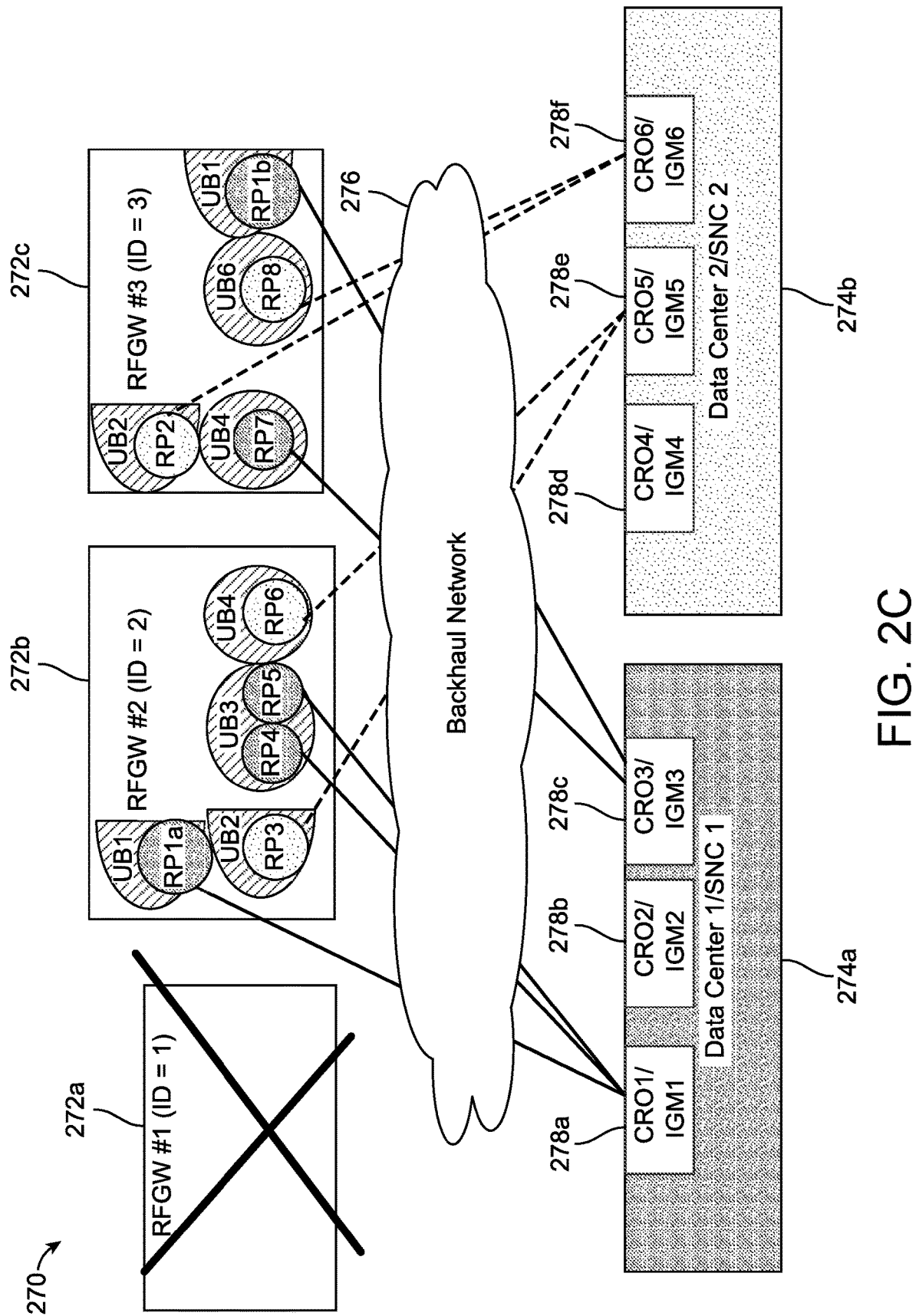
FIGS. 2C and 2D are diagrams that illustrate additional examples of mappings of gateways, data centers or satellite network cores, and user beams.

FIG. 2C is a diagram that illustrates an additional example of mappings of gateways, data centers or satellite network cores, and user beams. FIG. 2C shows a gateway backup scenario in which the gateway 272a becomes unavailable, as discussed above. Handling of user beam 1 (UB1), which was handled solely by the first gateway 272a before, is split and is moved to the second gateway 272b and the third gateway 272c. Resource pools are modified and created dynamically to carry out the adjustment. Here, resource pool 1 (RP1) of UB1 is split into two resource pools, RP1a and RP1b and they are assigned to two separate gateways 272b-272c. However, the association of these two resource pools is kept anchored on the first DC/SNC 274a to minimize packet loss and to maintain users traffic sessions. The portion of User Beam 2 (UB2-RP2) previously handled by the first gateway 272a is moved to the third gateway 272c, and its association to the second DC/SNC 274b remains unchanged. Therefore, after spectrum redistribution from the failed first gateway 272a to other gateways 272b-272c, the beam-to-DC/SNC mapping remains unchanged. In this example, it is shown either (i) a user beam in its entirety moves to a gateway (e.g., as the second gateway 272b alone feeds the user beam UB2) or multiple gateways can take over one user beam by feeding a portion of a beam by each gateway (e.g., with the gateways 272b-272c each feeding a different portion of the user beam UB1). Existing traffic sessions are maintained, and user traffic loss is minimized.

After reconfiguration, the mapping of individual transport components to spectrum chunks can be changed, however they do not change the associated data center (DC) or satellite network core (SNC). After a frequency reconfiguration, terminals on a user beam may see the same set of outroutes (with respect to frequency and size) or they may encounter different outroute carriers.

When the carrier definition remains unchanged after a reconfiguration, a terminal re-locks to the same outroute after the payload switch and resumes service very quickly. When the carrier definition is changed (typically for use cases other than backup) but at least one carrier remains unchanged (or anchor outroute), all terminals are moved to that carrier, receive the definition of new carriers through the new downlink profile from the NMS, and select one of the outroutes based on the load balancing metric to resume their services.

Frequency reconfiguration and spectrum redistribution may be needed for reasons other than the corrective or predictive gateway backup scenario, such as planned gateway expansion, gateway introduction, or illumination of new spectrum in an existing user beam or introduction of a new user beam.

Figure 2D:
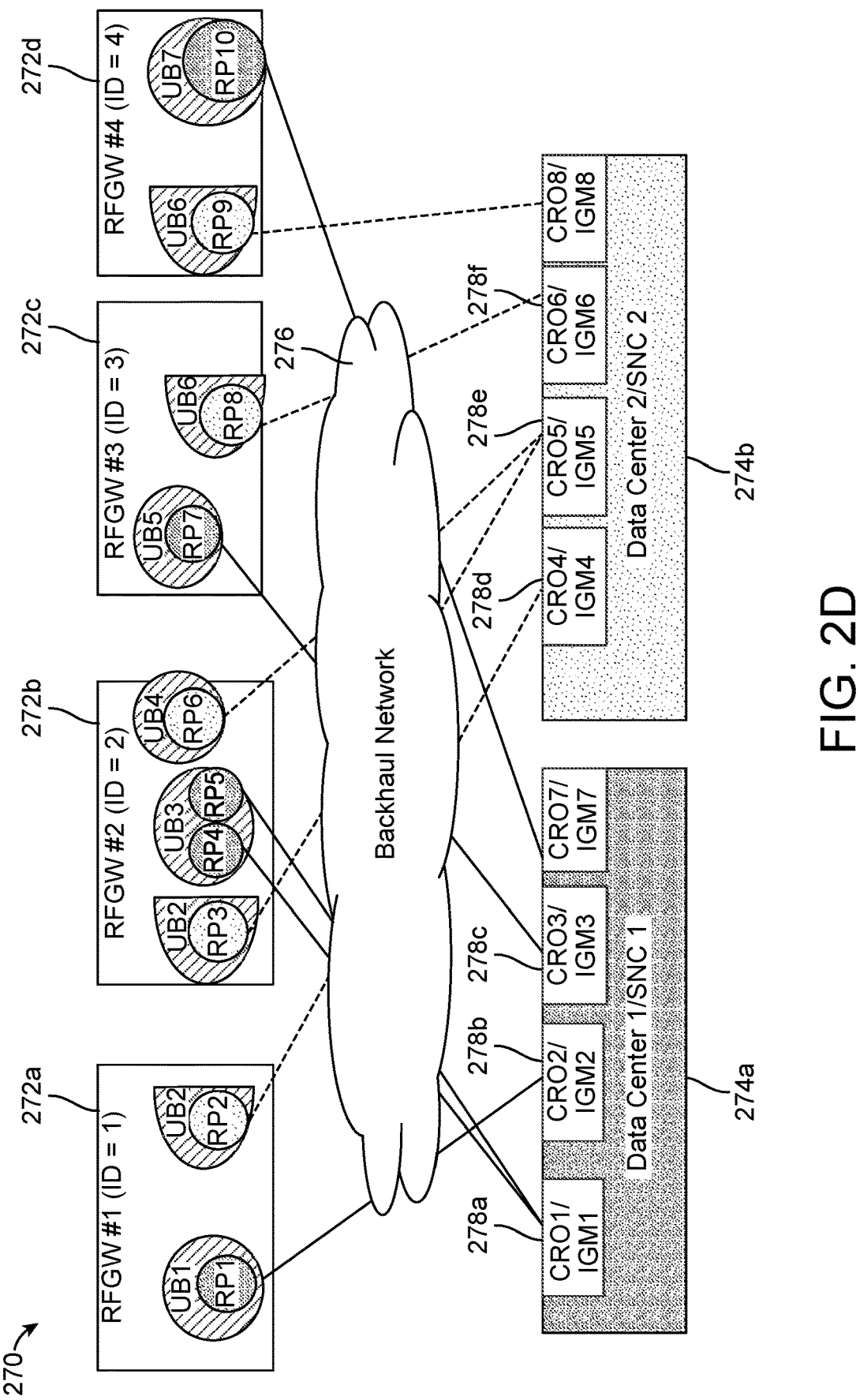

FIG. 2D is a diagram that illustrates additional examples of mappings of gateways, data centers or satellite network cores, and user beams. FIG. 2D shows an example of gateway and/or spectrum expansion.

In the example of FIG. 2D, a new fourth gateway 272d has been added into the network. This gateway 272d feeds a new seventh user beam, UB7. Also, the existing beam user beam UB6 is expanded by adding more spectrum into it by creating a new resource pool RP9 which is assigned to the new fourth gateway 272d. The new user beam UB7 is associated with the first DC/SNC 274a and the user beam UB6 remains associated with the second DC/SNC 274b although it is split in two gateways 272c, 272d. This reconfiguration event requires creation of a new resource pool RP9 in an existing beam UB6. One pair of CRO and IGM (CRO7/IGM7) is created in DC/SNC 274b to serve user beam 7. This needs to be done because a new modulator and demodulator is instantiated in the gateway 272*d*. Another pair of CRO and IGM (CRO8/IGM8) is created in the second DC/SNC 274*b* to serve the new resource pool RP9 of user beam UB6.

Creation of a new resource pool or modification of an existing resource pool due to merging of smaller carriers to a bigger carrier are supported. Some gateway backup events may require modification of a resource pool because the available backup portion in active gateways may not be enough to take over the full resource pool. There may be a case when a resource pool may need to be divided into two. For example, some spectrum chunks may be served by one gateway at one point in time, and later, a decision may be made that these chunks should be served by two gateways to achieve better availability through diversity.

Referring to FIG. 1B, as discussed above, the system can support a N:1 mapping between gateways and a DC/SNC. For example, FIG. 1B shows an example of this topology at an instant of network operation. The gateway-to-DC/SNC mapping is static with N:1 relationship. As shown in FIG. 1B, five gateways are associated with the first DC/SNC 174*a*, and other five gateways are associated with the second DC/SNC 174*b*. With respect to beam-to-SNC mapping, a user beam is served by only one DC/SNC at a time.

Referring again to the N:1 mapping example of FIG. 1B, again we can consider two groups of mapping, the first group consisting of gateways 172*a*-172*e* are mapped with the first DC/SNC 174*a* and the second group comprises of gateways 172*f*-172*j* along with the second DC/SNC 174*b*.

In the event of a gateway failure, the spectrum or beams currently served by the failed gateway are moved to other remaining active gateways. When a user beam is associated with only one DC/SNC, the movement of spectrum or beams of a failed gateway are restricted within the same group. For example, if a first gateway 172*a* fails, its spectrum can only be redistributed between gateways 172*b*-172*e* associated with the same DC/SNC 174*a* and cannot be moved to any of the gateways 172*f*-172*j* associated with the DC/SNC 174*b*. In this case, traffic sessions will be maintained as the sessions are anchored in one DC/SNC. The DC/SNC load remains balanced after reconfiguration.

However, if it is possible to move a user beam of a failed gateway entirely to another single gateway (e.g., without splitting among multiple destination gateways), then a different gateway-DC/SNC group may be selected. For example, one user beam UB1 of the first gateway 172*a* can be moved to the seventh gateway 172*g*. In this case, in addition to beam moves across gateways, the system also handles a beam move between DC/SNCs. When a beam from a failed gateway is redistributed among remaining active gateways within the same gateway-DC/SNC group, there is no difference compared to what is captured in the mesh mapping configuration.

Figure 4A:
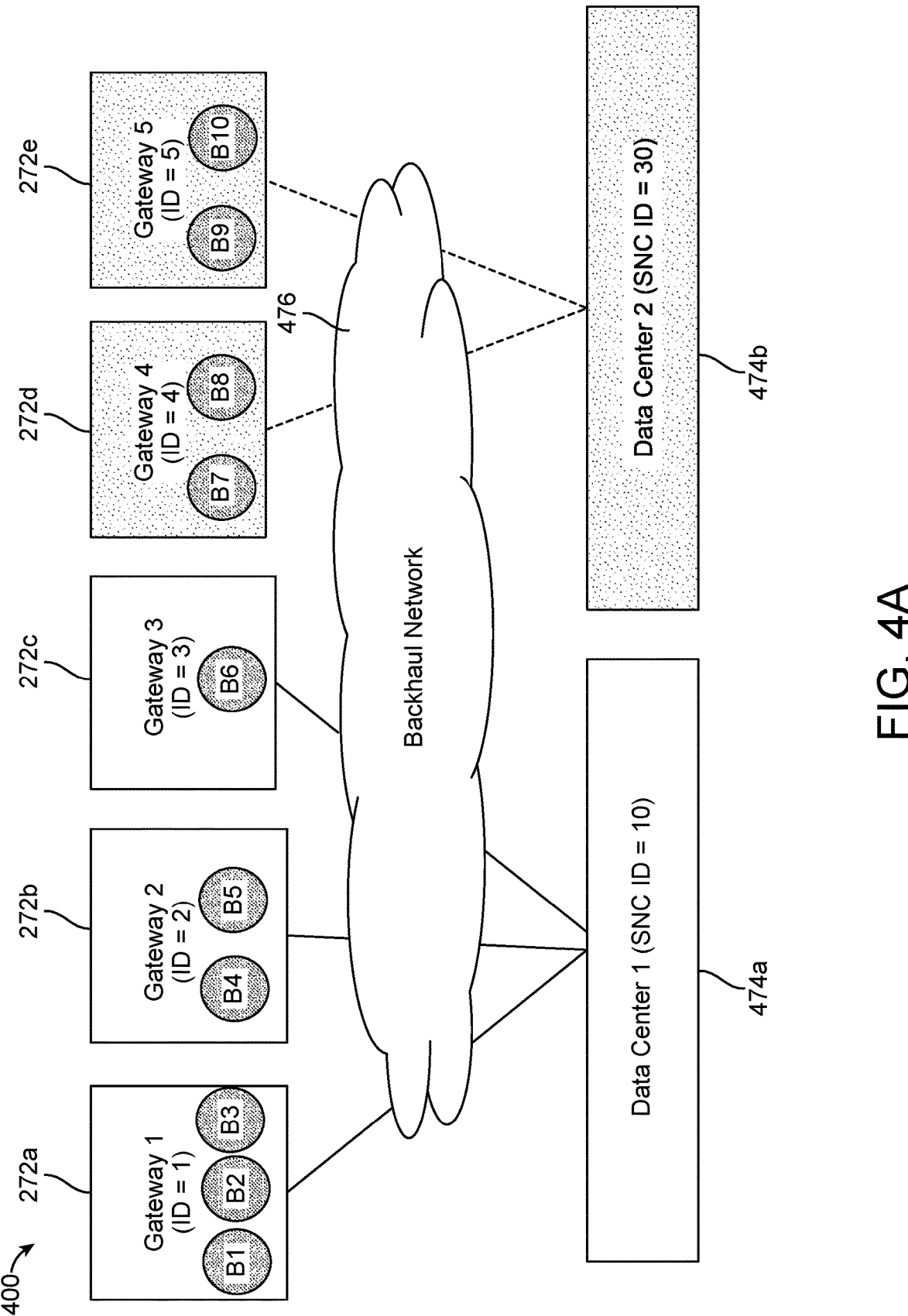
FIG. 4A is a diagram showing an example of a static mapping of gateways, beams, and data centers or satellite network cores.

FIG. 4A is a diagram showing another example of a static mapping of gateways, beams, and data centers or satellite network cores. In FIG. 4A, three RF gateways 402*a*-402*e* are mapped to one data center 404*a* (assigned SNC identifier 10) and two other gateways are tied to another data center 404*b* (assigned SNC identifier 30). These mappings are pre-configured using the network management system.

In a steady state, traffic from beams B1 to B6 is distributed among the first three gateways 402*a*-402*c*, and each beam is fully served by one of the gateway 402*a*-402*c*. The rest of the beams (e.g., B7 to B10) are distributed into the other gateways 402*d*-402*e*. In terms of traffic flows, traffic from terminals on beams B1 to B6 is flowing through DC1 (SNC 10) and traffic from terminals on beams B7 to B10 are flowing through DC2 (SNC 30). Traffic loads are balanced between two DCs 404*a*-404*b* by virtue of the static mapping of gateways to DC/SNCs.

Now, consider a situation in which the first gateway 402*a* is lost and either a predictive or corrective gateway backup procedure occurs. One active gateway cannot take over for a full gateway which is failed due to the constraint on the backup spectrum in a feeder link. So, the three user beams B1, B2, and B3 need to be distributed among multiple gateways, and a spectrum or frequency plan reconfiguration takes place. Either a user beam in its entirety moves to another gateway or multiple gateways can take over one user beam by illuminating portion of spectrum of a beam by each gateway.

Frequency reconfiguration and spectrum redistribution are needed for reasons other than the corrective or predictive gateway backup, such as planned gateway expansion, introduction, or illumination of new spectrum in an existing user beam or introduction of a new user beam.

When more spectrum is added to a user beam and one beam is entirely served by one gateway, this gateway continues to serve the beam and more feeder link spectrum is added from the gateway. If the user beam is already served by multiple gateways, the new spectrum is either assigned to a resource pool of one of the gateways or distributed among multiple gateways, as necessary. If new spectrum is added through a gateway which is not already servicing the affected user beam, the spectrum can only be added to the gateway which is mapped to the same SNC with which other gateways serving the beam before reconfiguration were associated.

Furthermore a new user beam can be illuminated and added into the system. When beam-to-DCc/SNC 1:1 mapping is used:

The new user beam can be assigned entirely to only one gateway. Based on the configured association of this gateway to SNC, the new user beam maps to that SNC The new user beam can be distributed to multiple gateways. In this case, only those gateways can be selected which map to one common SNC.

A new gateway can be added as part of gateway growth and is statically mapped to one of the DC/SNCs depending on capacity analysis. The new gateway may serve new user beams and also some of the existing beams or portion of beams can be transferred to the new gateway from other gateways as part of reconfiguration. When beam to DC/SNC mapping is used, one can move portion of a beam from an existing gateway to the new gateway if both source and target gateways are associated with one common DC/SNC.

Figure 4B:
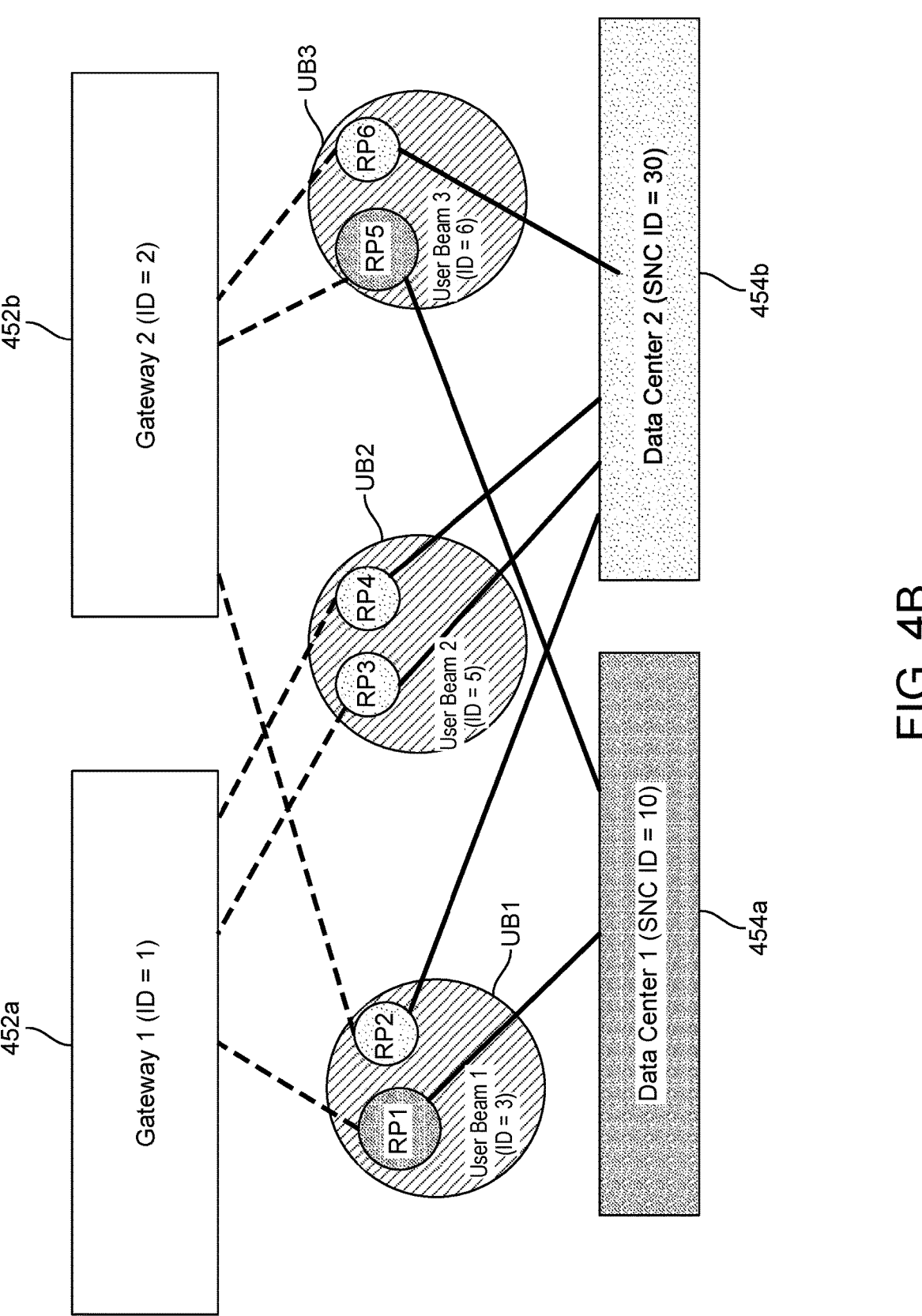
FIG. 4B is a diagram showing an example of a mapping of gateways, beams, resource pools, and data centers or satellite network cores.

FIG. 4B is a diagram showing another example of a mapping of gateways 452*a*-452*b*, beams UB1-UB3, resource pools RP1-RP6, and data centers or satellite network cores 454*a*-454*b*. Rather than map beams to DC/SNCs, the system 450 can map resource pools to DC/SNCs for added versatility. For example, the resource mapping to a DC/SNC is made at a finer granularity than for each beam, such as at the resource pool level, where one resource pool can be attached to only one DC/SNC at a given time. Two resource pools of one user beam can be mapped to two different DC/SNCs. A user beam may have one or more than one resource pools.

Multiple gateways 452*a*-452*b* can serve the same user beam as mentioned earlier by dividing the beam into multiple resource pools and assigning each resource pool to each gateway. A resource pool can be defined to be a collection of outroute carriers with associated inroute carriers.

As discussed above, the flexible reconfiguration system supports dynamic creation, deletion, and modification of resource pools. A reconfiguration event, which can be due to gateway growth or gateway redundancy or beam capacity redistribution, may require dynamic creation, deletion, and modification of resource pools. For example, gateway growth adds more spectrum that requires creation of a new resource pool or modification of an existing resource pool. A resource pool can be deleted from the source beam and a new resource pool may be created in the target beam when spectrum of a beam is moved to another beam.

In some cases, a resource pool may need to be divided into two. For example, at first a set of spectrum chunks is served by one gateway. Later, a decision is made that a chunk should be served by two gateways to achieve better availability through diversity. In this case, the original resource pool will remain in the system, but some chunks or carriers will be deleted from this resource pool (this resource pool remains at the same gateway and DC/SNC) and a new resource pool will be created assigning it to another gateway and its DC/SNC. A terminal will receive new resource pool information along with outroutes and can move across gateways for outroute load balancing and diversity purposes. If these gateways servicing these two resource pools are mapped to the same DC/SNC, terminals can keep traffic sessions maintained while moving between gateways.

The example of FIG. 4B shows two larger resource pools RP1 and RP5 assigned to DC/SNC 454*a* and four smaller resource pools RP2, RP3, RP4 and RP6 which are assigned to DC/SNC 454*b* to satisfy DC/SNC load balancing. If RP6 (which is illustrated as served by the second gateway 452*b*) moves to the first gateway 452*a*, this resource pool is still mapped to DC/SNC 454*b*, and therefore traffic sessions will be maintained for terminals using the resource pool RP6 and DC load will remain balanced. Two solutions are proposed to support resource pool granular SNC mapping.

When more spectrum is added to a user beam and that beam is entirely served by one gateway, this gateway continues to serve the beam and more feeder link spectrum is added from the gateway. If a user beam is already served by multiple gateways, the new spectrum is either assigned to resource pool of one of the gateways or distributed among multiple gateways, as necessary. When resource pool to SNC mapping construct is considered, the new spectrum can go to any gateway and any SNC. To be noted that if resource pools of one user beam are mapped to more than one SNCs, traffic sessions may not be maintained in a multi-gateway smart diversity environment.

Furthermore, a new user beam can be illuminated and added into the system. If resource pool to SNC mapping is used:

The new user beam can be assigned to only one gateway. Based on the configured association of this gateway to SNC, the new user beam maps to that SNC The new user beam can be distributed among multiple gateways. In this case, it is not required that all gateways over which the new beam is distributed to be associated with the same SNC.

A new gateway can be added as part of gateway growth which is statically mapped to one of the SNCs depending on capacity analysis. The new gateway may serve new user beams and also some of the existing beams or portion of beams can be transferred to the new gateway from other gateways as part of reconfiguration. If resource pool to SNC mapping is in place, then portions of a beam can be assigned to different SNCs.

Figure 5:
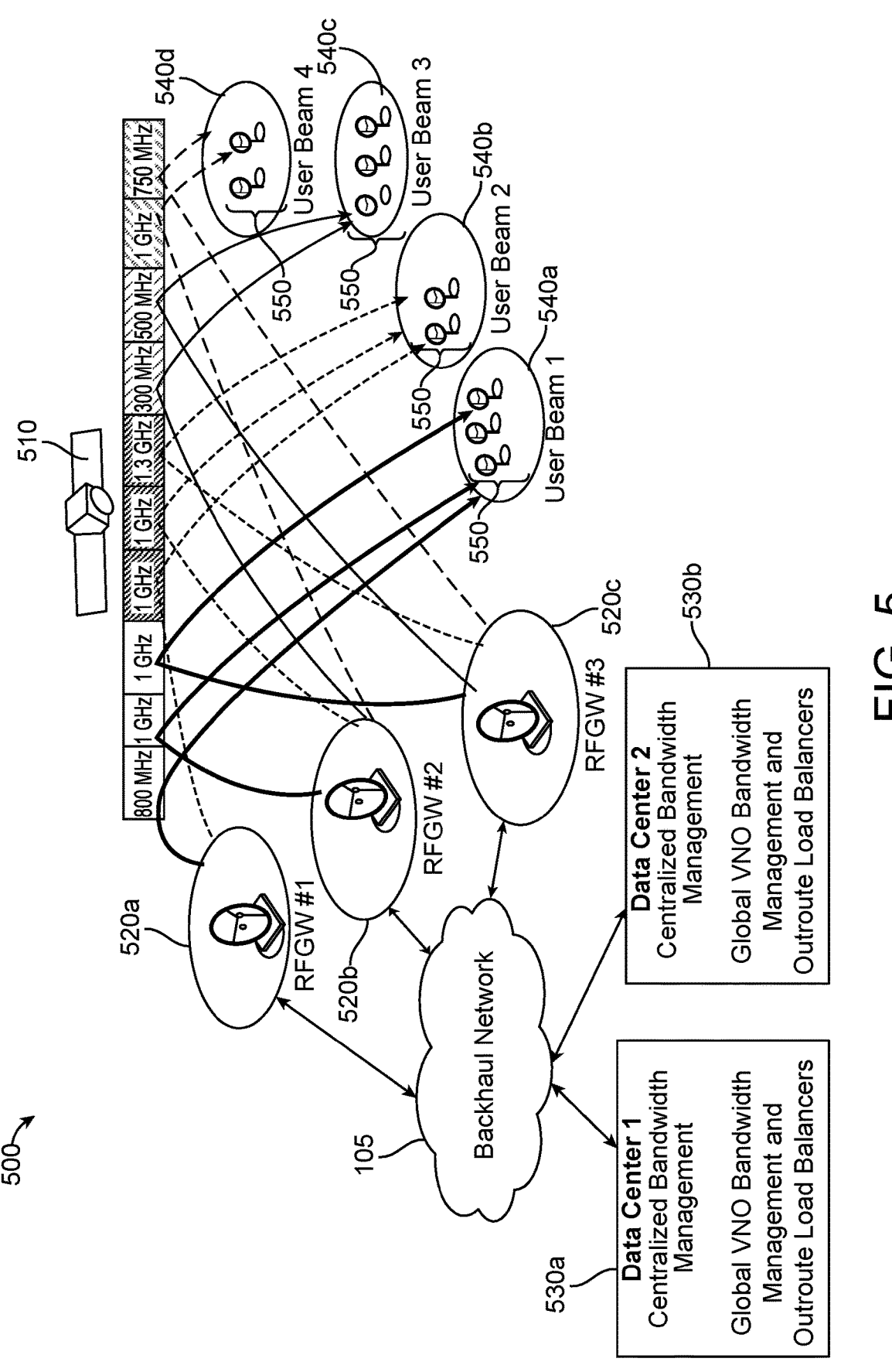
FIG. 5 is a diagram showing an example of inter-gateway outroute load balancing and diversity.

FIG. 5 is a diagram showing an example of inter-gateway outroute load balancing and diversity. The system 500 can use multiple gateways 520 to balance load across outroute carriers.

The example shows a satellite 510, three terrestrial radio-frequency (RF) gateways 520*a*-520*c* (labeled RFGW 1 to RFGW 3), two data centers or satellite network cores (DC/SNCs) 530*a*-530*b*. The gateways 520*a*-520*c* communicate with their corresponding DC/SNCs 530*a*-530*b* over a backhaul network 505, which may include the Internet or other public or private networks. The satellite 510 provides four user beams (e.g., spot beams) 540*a*-540*d* to provide service to terminals 150, such as very small aperture terminals (VSATs). The terminals 150 communicate with the satellite 110 using ten different frequency channels or carriers.

Within a single beam 540*a*-540*d*, there can be multiple resource pools and each resource pool can have multiple outroutes. A terminal assigned with one resource pool can move between outroutes within that resource pool for load balancing and availability purposes. When a terminal 550 is assigned to multiple resource pools of a beam, it can move between outroutes within a resource pool and also across resource pools. A resource pool is served by one gateway 520*a*-520*b* at a given time. When a terminal 550 moves across outroutes being served by the same gateway 520*a*-520*b* for load balancing or availability purposes, it is called an intra-gateway load balancing or intra-gateway diversity. If a terminal 550 moves across outroutes being served by different gateways 520*a*-520*b*, it is called an inter-gateway load balancing or inter-gateway diversity. The inter-gateway outroute load balancing or diversity is a new capability that is enabled by the techniques discussed herein.

A terminal receives a transmission of system information that includes outroute information from all resource pools as required. To the terminal, there is no differentiation of resource pools, in other words, terminal does not know which outroutes belong to which resource pool. The downlink profile specifies the corresponding gateway ID for each outroute. When outroute move occurs at the terminal due to outroute unavailability, it is better for a terminal to first try outroutes from another gateway to have a better chance of service availability. Similarly, when there is a tie between two outroutes with respect to the load, a terminal prefers the outroute that is served from its current gateway. To this end, explicit knowledge regarding the serving gateway for each outroute in the downlink profile is very useful.

The flexible channelizer in the satellite payload that makes it possible for the satellite 510 to handle multiple gateways 520*a*-520*c* sending signals to and receiving signals from the same user beam. The multiple feeder links from multiple gateways 520*a*-520*c* are switched to the same user beam by the flexible payload of the satellite 510. A resource pool or forward carriers along with their associated return carriers can be fed from only one gateway. This means a terminal 550, after selecting a forward carrier served by a gateway 520*a*-520*c*, cannot use return carriers from a different gateway 520*a*-520*c*.

In the example of FIG. 5, User Beams 1 and 2 are being served by three gateways 520*a*-520*c*: gateways #1, #2, and #3, and User Beams 3 and 4 are being served by two gateways: gateways #2 and #3. Three gateways are connected to two central DC/SNCs 530*a*-530*b* (where baseband system bandwidth management occurs) through a backhaul network. A specific user beam can see carriers from many gateways 520*a*-520*c* (in the example, a maximum of three gateways is shown, but in reality, it could be more than three), and so terminals 550 can move around between carriers from many gateways 520a-520c. A smart load balancing algorithm keeps both the satellite resources, and the gateway baseband resources are balanced in the system 500. A terminal 550 may move between multiple gateways 520a-520c due to various reasons, such as:

Link with its current gateway is not working due to fade at the gateway site.

Link with its current gateway is not working due to modulator or demodulator failure at the gateway site.

Some terminals 550 cannot meet their QoS requirements from their current gateways 520a-520c because of link degradation which can force them to move to carriers on other gateways 520a-520c.

Load balancing requires terminals 550 to be moved to other gateways.

As with other conditions or situations that indicate a need for reconfiguration, the system can detect these conditions and automatically initiate the appropriate configuration changes in response.

The association of terminals 550 with the IP processing and acceleration or optimization node at the DC/SNC does not change when the terminals 550 move around different gateways 520a-520c. Also, the point of connection to the external network from the data center is not changed, which allows all ongoing TCP sessions to be maintained across the gateways 520a-520c switch for load balancing or diversity purposes. In some configurations, the gateways 520a-520c serving a user beam may not be associated with the same SNC (N:1 static gateways to SNC mapping). In such a case, if a terminal 550 moves to a different SNC after selecting an outroute from a gateway 520a-520c, traffic sessions cannot be maintained.

In the example represented by FIG. 5, user beams 1, 3 are associated with a first DC/SNC 530a ("DC1/SNC1") and beams 2, 4 are associated with a second DC/SNC 530b ("DC2/SNC2"). Therefore, when a terminal 550 moves to a different gateway for load balancing or diversity, traffic sessions are maintained. The outroute load balancing can occur every time a reconfiguration happens. The system 500 ensures no thrashing while load balancing occurs after a reconfiguration by applying a random back off when terminal 550 runs a load balancing algorithm or executes outroute move after a reconfiguration.

In case of multiple gateways 520a-520c serving one common beam, various situations can be encountered when a terminal 550 moves across different outroutes of this beam for load balancing purposes. When an outroute move is performed for load balancing purposes, the affected terminal 550 does not care which outroutes are served from which gateways 520a-520c. The terminal 550 selects the best optimum outroute which can be from its current gateway 520a-520c or from a different gateway 520a-520c. In all cases, traffic sessions remain in the same DC/SNC if all gateways 520a-520c serving a common beam are associated with one common DC/SNC, and which will be the case. Various situations include:

Terminal 550 moves from one outroute to other within a resource pool which are being served by the same gateway 520a-520c.

Terminal 550 moves from one outroute to other across resource pools being served by the same gateway 520a-520c.

Terminal 550 moves from one outroute to other across resource pools being served by a different gateway 520a-520c.

The techniques discussed above provide novel features for outroute load balancing that works across outroutes within a gateway 520a-520c. There are certain differences between intra-gateway and inter-gateway switching on outroute move. Due to differences in timing (for example, geographic locations of two gateways are different) and possible difference in power between the transmission paths of two gateways, a terminal establishes new timing and power with the target gateway after the switch which is not required in case of intra-gateway outroute move (power adjustment on the inroute may be needed in case of intra-gateway load balancing). Another difference is that two or multiple gateways feeding one beam may have different link condition (for example, rain at the location of one gateway).

Once a terminal 550 executes an outroute move for load balancing or availability purposes and changes its gateway association, parameters such as timing, power, and other aspects are considered in order to archive a time-efficient switch, such as not more than 2 seconds of traffic impact or outage when the outroute move is for load balancing purposes. On the other hand, when an outroute move to a different gateway is made due to unavailability of the previously-used gateway, terminal is able to send an Aloha transmission within 2 seconds after the current outroute lock timeout (e.g., in range of 5-60 sec) with the novel techniques for fast switchover.

The inter-gateway outroute load balancing works in a similar way as intra-gateway outroute load balancing, but with the following changes and considerations. Like intra-gateway outroute load balancing, terminal and IPGW pause traffic, IPGW resumes traffic after the expiration of resumption timer (which is set close to the sum of terminal's lock to demod time and terminal's lock to timing). An IPGW can be an Internet Protocol (IP) processing server or other IP handling component. However, the gateway change in inter-gateway outroute load balancing case requires each terminal to adjust the timing difference arises due to the geographic location differences between two gateways. This timing adjustment is performed by a terminal by calculating the arrival time difference of timing packets at the terminal between the last packet received over the old or switching-out outroute and the first packet received over the new or switching-in outroute. To obtain the timing packet arrival time at the terminal on the switching-in outroute, terminal needs to receive at least two-timing packets over the new outroute. If satellite ephemeris data is available, then it is possible to calculate the delta by observing $T_{hsh}$ (Hub-Satellite-Hub propagation delay) values from two gateways.

Another important aspect is possible transmission power difference from two different gateways 520a-520c. The inroute closed loop power control takes care of the difference, but in some cases the initial bursts can either arrive at the gateway too hot or may not go through due to lack of power. This is a general item applicable regardless of outroute move is intra or inter-gateway. However, the requirement is more prudent in the case of inter-gateway outroute move. The discussion of physical layer changes explains additional functions performed for outroute power level balancing.

In some implementations, a terminal can be required to directly receive stream bandwidth from the resource pool of the target gateway right after it moves to this gateway for outroute load balancing purposes.

Blind load balancing without giving any attention to individual terminals service plans may cause a load balancing scenario in such a way that many small services plan terminals end up on the gateway with better link and small number of bigger service plan terminals end up on the gateway with bad link. This may result in some terminals do not get proportionally fair allocation of bandwidth with respect to other terminals. This issue does not appear in case of intra-gateway outroute load balancing because typically all outroutes are affected similarly in case of a gateway-centric fade. Individual terminals may have local fade, in which case it is fine if these terminals do not get proportionally fair allocation. Terminals service plan metric are considered in the load balancing algorithm to mitigate the issue mentioned.

The outroute load balancing algorithm also takes care of imbalanced outroutes from multiple gateways when fade or link condition is not uniform across those multiple gateways.

Figure 6:
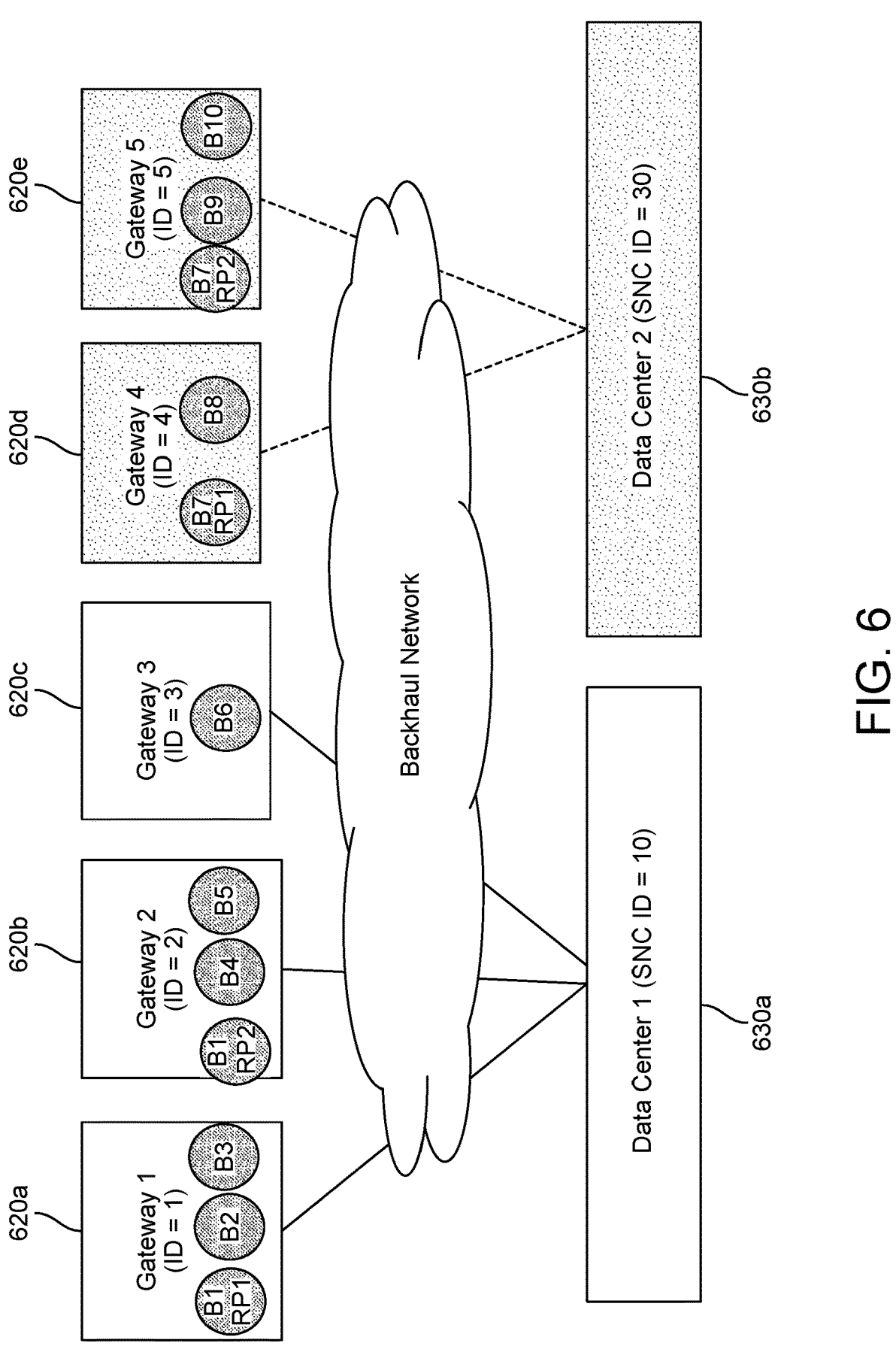
FIG. 6 is a diagram showing an example mapping of gateways, beams, resource pools, and data centers or satellite network cores.

FIG. 6 is a diagram showing an example mapping of gateways, beams, resource pools, and data centers or satellite network cores. Many of the examples discussed above show configuration scenarios where any gateway 620*a*-620*e* can be mapped to any DC/SNC 630*a*-630*b*. The present techniques can also be used to perform an inter-gateway load balancing operation with the option of static mapping of gateways to SNCs.

Beam 1 is divided into two resource pools being assigned to two gateways 1 and 2. Beam 7 is also divided into two resource pools being assigned to gateways 4 and 5. Here, gateways 1 and 2 simultaneously serve the user beam 1 and gateway 4 and 5 serves the user beam 6. Note that user beam 1 is served by the same SNC with respect to its two resource pool parts and user beam 6 is also served by the same SNC with respect to its two resource pool parts. There is no difference in outroute load balancing procedure in case of static gateway-to-SNC mapping from the case of mesh type mapping between gateway and SNC.

As mentioned earlier, one major difference between intra-gateway and inter-gateway outroute load balancing operation is the different link condition due to different fades at different gateway sites in case of an inter-gateway outroute move. The new techniques described herein can take care of this variability by including utilization and plan density metrics in load balancing. When there is a tie between two outroutes with respect to load from two different gateways, a terminal selects the outroute that is served from its current gateway.

Examples of optimizations that can be used to achieve the stringent outroute load balancing switch time include:

Terminal receives outroute control messages and user data in parallel while it is performing frequency-locked loop (FLL) lock. For example, system info messages, control messages that describes inroute layout and system timing message are processed by the terminal before it achieves the FLL lock IPGW does not need to wait for the readiness of terminal's inroute transmission to resume forwarding user data through the terminal's new or switched-in outroute. In other words, the gateway resumes traffic before receiving the Outroute Move Complete (OMC) message from the terminal. Terminal generates this message when he is ready to transmit inroute bursts In intra-gateway case, since a terminal typically remains within the same resource pool after an outroute move, its inroute stream allocation is still held. Hence, the terminal can continue in its stream allocation after the move and does not require to send Aloha burst to obtain stream bandwidth. Collisions on Aloha and one round trip time to get stream bandwidth would delay the resumption of terminal traffic if stream bandwidth for the terminal were not held.

In previous systems, beams generally were not split across multiple gateways. The present techniques allow for load balancing even when a beam is split across multiple gateways. In an inter-gateway load balancing case, the transfer can be made so that the terminal, after outroute move, can resume directly on its stream inroute allocation without needing to request stream bandwidth from the inroute resource manager. After moving to the outroute from a different gateway, it could be possible that terminal gets inroute assignment from a different inroute resource manager than it was getting before the outroute move.

When it is decided that a terminal needs an outroute move for inter-gateway load balancing, in addition to the Outroute Move Initiated (OMI) message being sent to the networking component at the data center through the gateway serving the switched out outroute, it sends an "Outroute Move, Inroute Reserved Bandwidth request" to the Inroute Resource Manager serving the terminal's beam. It is to be noted that the reserve bandwidth request is sent without the terminal having to wait for the Outroute Move Initiated message ACK response from the DC/SNC such that the stringent switch time budget can be met. Then terminal waits for a successful ACK response for the OMI message and either a successful response or error response for the Outroute Move Inroute Reserved bandwidth request messages, or response time-out for the reserve request message. In order to progress further in the outroute move process, the terminal must receive a successful ACK for the OMI message and either a positive or negative response for the bandwidth reserve messages or the bandwidth reserve response times out.

In case of inter-gateway outroute load balancing, the user beam is not changed from the terminal perspective, but as discussed earlier the association of terminal to inroute resource manager may change as terminal moves across gateways. The inroute bandwidth reserve message contains the essential context info containing terminal's service plan information, terminal inroute allocation identity among other items. From the response message of the inroute bandwidth reservation, the terminal knows about the success or failure of allocation. If allocation is successful, more information is passed via this response message such as assigned inroute information. Please note that terminal does not abandon its outroute move even though it might have received a negative response or have not received response within the stipulated outroute move timeout even after configurable number of retries.

A terminal locks to the new or switched-in outroute from another gateway, processes system and inroute control messages including timing packets and selects the assigned inroute set as specified in the bandwidth reserve response message. Once FLL lock is achieved, the terminal directly looks at inroute bandwidth allocation messages (without needing to send Aloha message) and immediately starts sending data on stream bursts. Note that terminal sends Outroute Move Completed (OMC) message to the DC/SNC in parallel with user data on its stream allocation. The point is that terminal does not wait for the OMC Response acknowledgement (ACK) message from the DC/SNC before sending user data. As stated earlier, inroute resource manager reserves a priori terminal's allocation. If terminal had received error response for its bandwidth reserve message or not received any response, it uses an Aloha channel after the FLL lock to obtain stream bandwidth.

The present systems and techniques also enable enhanced capacity redistribution among beams. This use case deals with the moving spectrum from one beam to another as required based on mobility pattern of mobile terminals that has a temporal component. This can be applicable to fixed terminal cases. The system keeps track of mobility pattern and generates reconfigured frequency plan to redistribute capacity among beams.

When one user beam receives more capacity, the system makes sure that at least one of the outroutes of the beam remains unchanged so that the system does not lose any terminals. Likewise, the source beam(s) from which capacity is reduced and sent to the other beam should keep one outroute unchanged.

Figure 7A:
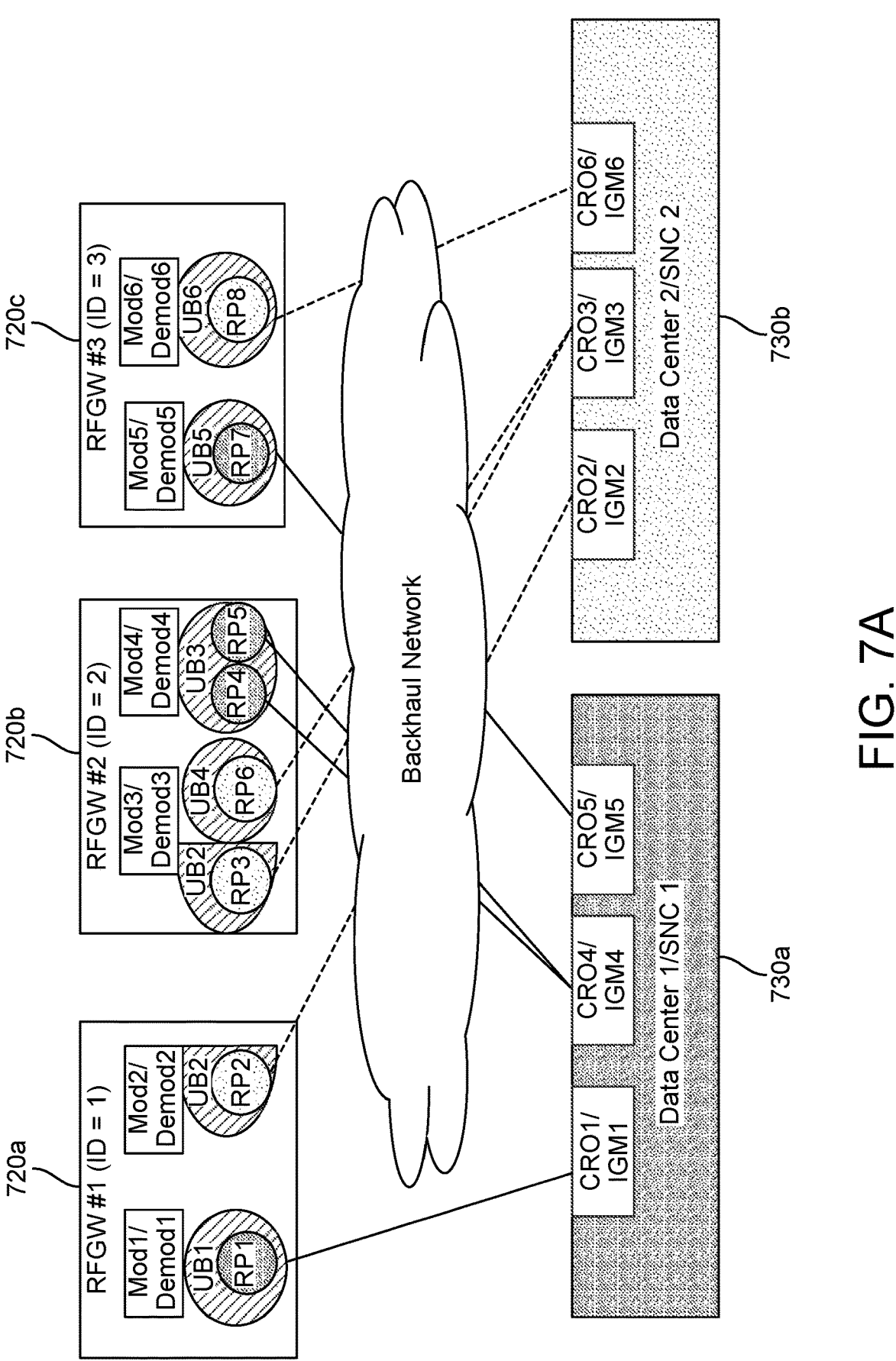
FIG. 7A is a diagram that shows associations of gateways and data centers or satellite network cores before a failover operation.
Figure 7B:
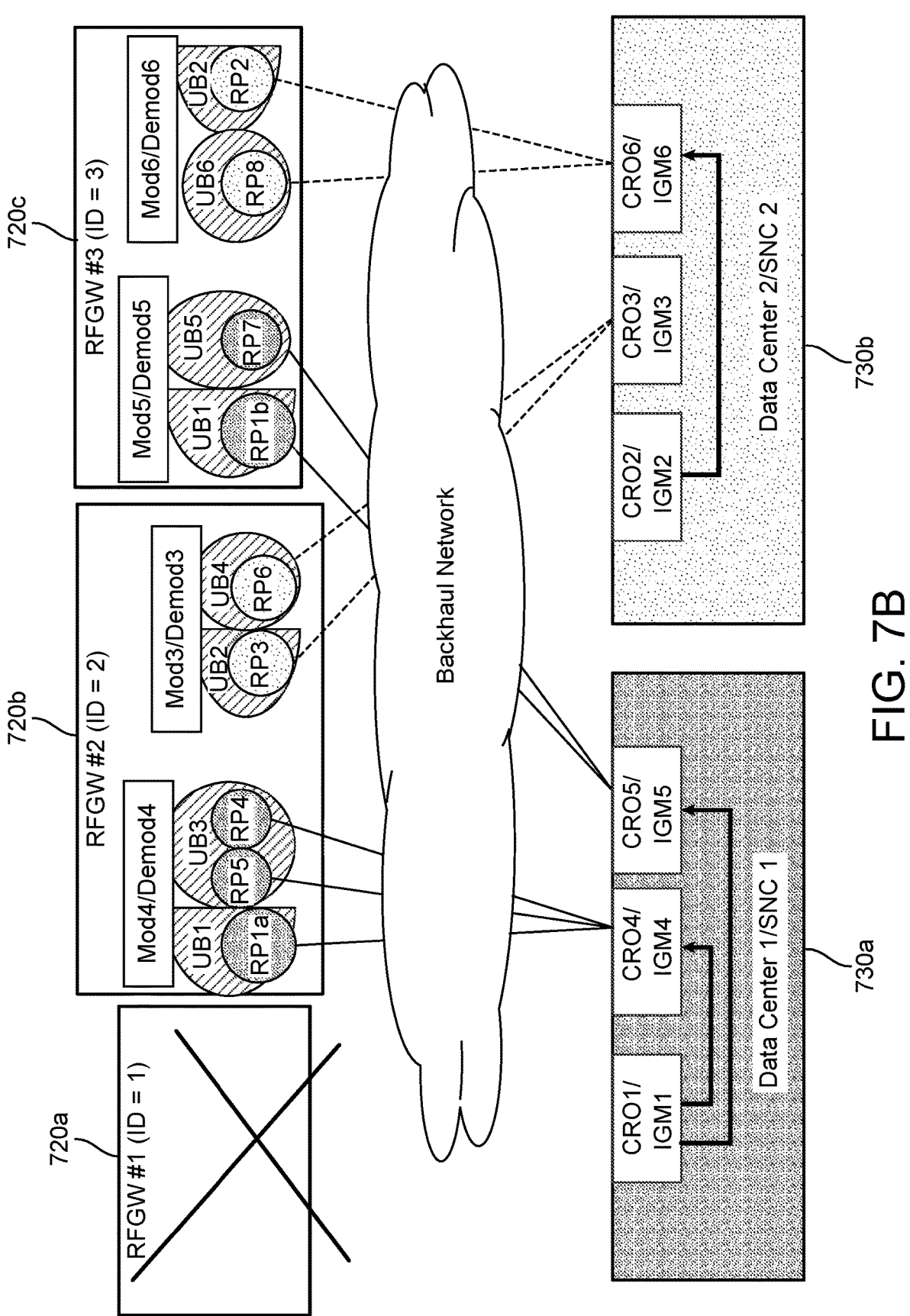
FIG. 7B is a diagram that shows associations of gateways and data centers or satellite network cores after a failover operation.

FIGS. 7A and 7B show an example of reconfiguration for switchover or failover to change the handling of spectrum among gateways. FIG. 7A shows associations of gateways 720a-720c and data centers or satellite network cores (DC/SNCs) 730a-730b in normal operation in a first configuration. FIG. 7B shows associations of the gateways 720a-720c and DC/SNCs 730a-730b after a failover operation, showing a change in configuration after the first gateway 720a fails or becomes unavailable. These figures can help illustrate techniques for managing gateway diversity and SDN or segment routing.

When a satellite having a flexible payload is used, gateway diversity or redundancy operates in a different way than the typical N:1 or N:K diversity. Typical redundancy techniques involve one or more idle backup gateways (e.g., 1 or K backup gateways) not sending or receiving any traffic in the normal situation when all primary gateways are healthy and can take over any failed primary gateways. In a flexible payload system, there is no need to maintain dedicated idle backup gateway(s) to provide redundancy. Instead, all gateways are active in a normal situation, and when one or more gateways fail, the spectrum and/or beams served by failed gateway(s) are moved to the feeder links of one or multiple remaining active gateways.

In the flexible payload system, spectrum and/or beams of a failed gateway are distributed among multiple active gateways, as long as those gateways have some backup or unused feeder link capacity. In cases where idle backup feeder link spectrum is not available, a larger reconfiguration occurs to squeeze a failed gateway's spectrum into an active gateway's feeder link, which may result in a reduction of beam capacity of both the failed gateway's beam as well as active gateways beams.

When the spectrum of a beam of a failed gateway needs to be distributed (possibly among more than one modulator or demodulator in one active gateway and also among multiple gateways), there may be multiple serving outroute and inroute transport (CRO and IGM) components that would need to take over a failed gateway beam. The IGMs/CROs which are taking over a specific beam of a failed gateway are from the same DC/SNC because of the 1:1 mapping between a user beam and DC/SNC.

The backhaul network between gateways and DCs/SNCs can use a Segment Routing IPv6 (SRv6)-based segment routing transport network. A centralized software-defined networking (SDN) controller distributes a segment identifiers list to provider edge devices and segment nodes. The modulators and demodulators and the CROs/IGMs register with the SDN controller using their identifiers. With flexible payload gateway diversity, it can be challenging to meet stringent switching time requirements. There are multiple ways the frequency plan reconfiguration can be done for a gateway failover event. For example, the frequency plans for various gateway failure cases can be configured in advance of the switch, potentially with the reconfiguration plan being set a few weeks or even months in advance. Then, when a change is needed, the appropriate predetermined plan is executed just in time. The baseband system can pre-store plans in its DC/SNC and gateway components, and the baseband system can perform some pre-processing to reduce the processing time when the request for actual execution of a plan is needed.

To minimize traffic impact or loss of traffic, one or more of the following techniques may be implemented. First, the system can replicate traffic from the outroute transport CRO to the failed gateway and the gateway(s) taking over the failed beam. As another example, using SDN-controlled segment routing, the system can replicate an inroute burst plan from the inroute transport IGM to both the gateway(s) being switched out and the gateways being switched in. Second, the system can freeze stream bandwidth so that terminals after moving to the target gateways (e.g., which are taking over failed beams) can immediately send bursts on stream allocation. Third, the system can transmit rapid timing packets (e.g., sending timing packets at a higher rate) during the switchover transition period so that each terminal can lock its timing to the switched-in gateway quickly.

There are many scenarios of gateway diversity that can affect the user beam frequency plan before and after the diversity switch. In a first case, no change is observed in the outroute carrier definition of any user beams in terms of both size and center frequency and as well as for inroutes that are moved from the failed gateway and distributed to other gateways. However, on the feeder link side, size remains the same but center frequency is changed. In a second case, outroute carrier definition is unchanged, but inroute carrier definition is changed. In a third case, both outroute and inroute definitions are changed. These cases are examples, but are not intended to be exhaustive. The replication process is completely transparent to any components other than only IGM and CRO (transport components).

In the example of FIGS. 7A-7B, the switchover is facilitated using a relay function in the CRO and IGM. The relay function can shift handling for a beam or portion of a beam from one CRO to another CRO and/or from one IGM to another IGM. Because a beam may be segmented and distributed among multiple modulators and demodulators (in one gateway or in multiple gateways), the relay function of a CRO may need to reach multiple other CROs and is determined at an outroute level of granularity.

As shown in FIG. 7A, a multi-outroute/multi-beam CRO 1 was serving beam UB1 associated with modulator 1 at the first gateway 720a before failure. Consider a situation in which the first gateway 720a fails or is predicted to be unavailable due to predicted rain or maintenance. The information about the unavailability of the first gateway 720a is conveyed to CRO 1, and the relay function of the CRO is activated (e.g., triggered due to the detected or predicted unavailability of gateway 720a). In the example, the beam UB1 is going to be split and moved to two remaining gateways, the second gateway 720b and the third gateway 720c. In the example, the user beam UB1 includes three outroutes in a resource pool RP1 with associated inroute resources served by IGM1 and demodulator 1. The frequency plan is designed in such a way that (i) two outroutes, with their associated inroute spectrum, move to the second gateway 720b in resource pool RP1a and (ii) the third outroute, with its inroute resource, moves to the third gateway 720c in resource pool RP1b. These two resource pools RP1a, RP1b are dynamically created as part of the reconfiguration.

The resource pool RP1a will be served by modulator 4 and demodulator 4, which were both partially occupied before the failover and are respectively mapped to CRO 4 and IGM 4. Similarly, the resource pool RP1*b* will be served by modulator 5 and demodulator 5, which both were partially occupied before the failure event and are respectively mapped to CRO 5 and IGM 5. During the switchover transition period, the relay function in CRO 1 forwards DVB-S2 codeblock frames destined to outroute 1 or outroute 2 to CRO 4, and codeblock frames destined to outroute 3 to CRO 5 using an internal tunnel mechanism. FIG. 7B shows the result of the reconfiguration, with the user beam UB1 split among the gateways 720*b*-720*c*, and with the forwarding of data among the CROs/IGMs indicated with arrows within the DC/SNCs 730*a*-730*b*.

For simplicity, FIGS. 7A-7B show a relay function from one source CRO (e.g., CRO1) to multiple target CROs (e.g., CRO4 and CRO5). Nevertheless, in case of a failure involving multiple modulators/demodulators servicing spectrum of one gateway or multiple gateways, there may be multiple source CROs relaying codeblocks to multiple target CROs.

The target CROs (e.g., CRO 4 and CRO 5 in FIG. 7B) receive relayed codeblocks encapsulated in an internal tunnel and send those frames to their associated modulators. The same MODCODs on which these frames are sent by the CRO1 are used by CRO 4 and CRO 5 for relayed codeblocks. The target CROs transparently forward relayed codeblocks to their modulators.

A synchronization procedure can be carried out so that components of the DCs/SNCs 730*a*-730*b* and gateways 720*a*-720*c* are aware of the satellite payload switchover event. When the payload switchover event on the satellite is completed, traffic sender components at the DC/SNC switch the traffic for the re-configured user beam to the target CROs, so the forwarding from the source CRO is no longer needed. The source CRO (e.g., CRO 1) stops receiving traffic for the transferred beam(s) and so it stops relaying codeblocks to the target CROs (e.g., CRO 4, and CRO 5). The target CROs start their regular flow control functions with modulators and gateways 720*b*, 720*c*. The reconfiguration preparation phase configures traffic sender components to make them aware that once the satellite payload switch is done, they need to switch the CROs used for specific outroutes. System control messages generated by a source CRO are also relayed to target CROs including the timing packets. This occurs automatically, as relaying occurs at the codeblock level.

A stringent switch time budget can be met most effectively if the inroute definition does not change after a reconfiguration. For replication and bandwidth allocation freezing to be performed most efficiently, inroute channel definition can be maintained unchanged before and after the gateway backup switch.

When a beam is segmented, inroute resources may be assigned to multiple demodulators in one gateway. As another option, inroute resources can be assigned to multiple gateways to support multi-gateway diversity. The segmentation of a beam can be dynamic. For example, in the nominal case when no gateway has failed, there can be two demodulators that are serving a beam from one gateway. However, if this gateway fails, the same beam could be split to be served by two demodulators from one other gateway and also one demodulator each from two other gateways. This arrangement can be implemented by creating more inroute MHz carve-outs that distribute the spectrum among the multiple target gateways used in the new frequency plan used after reconfiguration.

The system can predetermine the worst case number of demodulators, representing the maximum number of inroute spectrum carve outs that may be needed. The system can determine the maximum number of demodulators that may be assigned for a specific beam and/or resource pool across multiple pre-stored frequency plans, and the system also considers chunk allocation to determine how many separate inroute layouts should to be created. As discussed above for FIG. 3B, the system can store multiple frequency plans 375 that are available to be used. The frequency plans can include assignments of CCBs (and/or portions of CCBs, such as IMCs) to gateways and to different beams, and assignments of beams to gateways. By knowing in advance how each frequency plan has been defined and by following the predefined frequency plans, the system can carve out inroute layouts for nominal or steady operation such that when the system moves to any of the gateway failure frequency plans, the same definition of inroute layouts can be maintained. Using the same inroute layouts across different frequency plans facilitates replication of inroute control messages and freezing of inroutes allocation during gateway fail switchover transition. Examples of these features will be discussed further below.

Figure 8A:
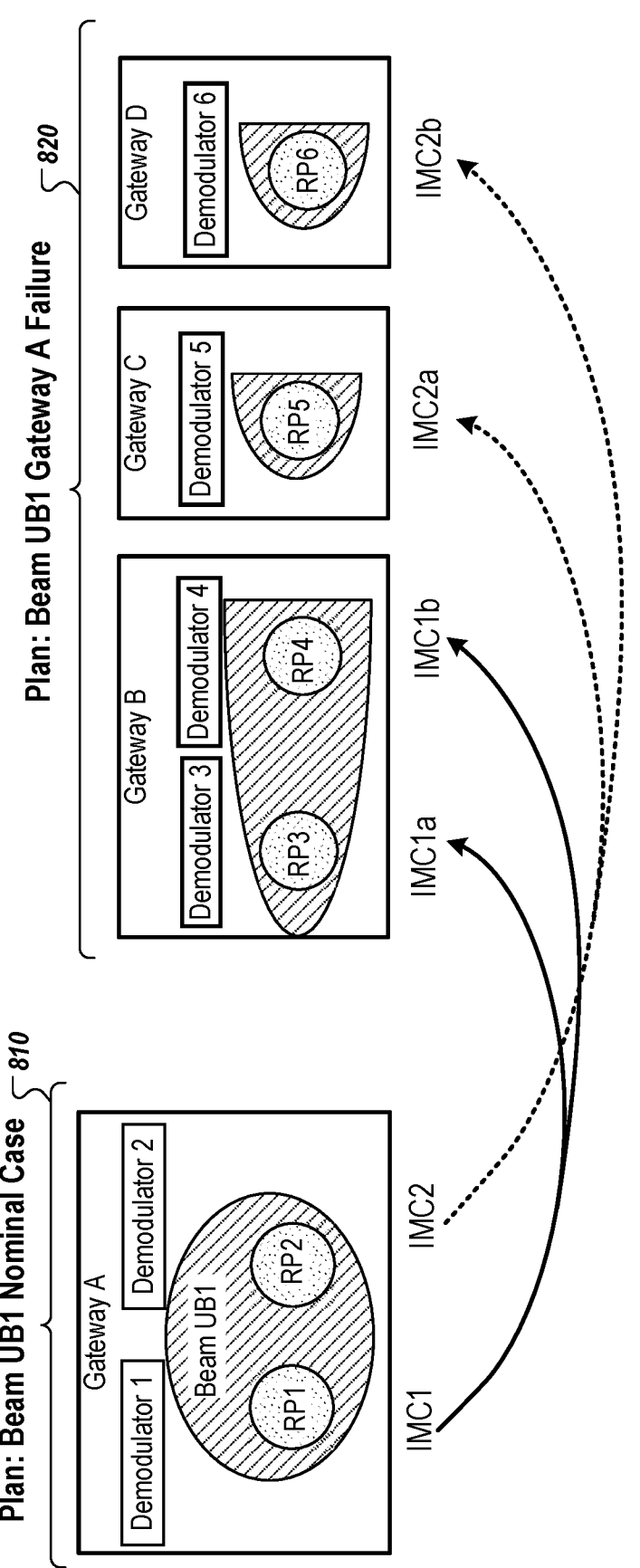
FIGS. 8A and 8B are diagrams that show examples of frequency plans.

FIG. 8A shows an example of two frequency plans 810, 820 for handling a user beam. The first frequency plan 810 shows the nominal case, in which no gateway has failed. In this frequency plan 810, a beam UB1 has two resource pools, RP1 and RP2, with one inroute carve-out per resource pool, IMC1 and IMC2. IMC1 is assigned to one demodulator and IMC2 has been assigned to another demodulator of the same gateway, so both spectrum segments IMC1 and IMC2 are served by the same gateway A.

The frequency plan 820 corresponds to a failure of gateway A and has four resource pools, RP3-RP6, with one inroute carve-out per resource pool. Two resource pools, RP3 and RP4, are assigned to gateway B (on two demodulators), one resource pool RP5 is assigned to gateway C (one demodulator), and the remaining resource pool RP6 is assigned to gateway D (one demodulator). IMC 1 of the nominal case frequency plan 810 is divided into two IMCs, labeled IMC1*a* and IMC1*b*, which are assigned to different demodulators in gateway B. IMC2 is divided into two IMCs, IMC2*a* and IMC2*b*, and they are assigned to gateway C and gateway D respectively, each on one demodulator. In this case, the system uses the total number of IMCs across the set of predefined frequency plans 810, 820 regardless of nominal case operation or one gateway failure, the system needs to create at least four inroute MHz carve-outs.

Figure 8B:
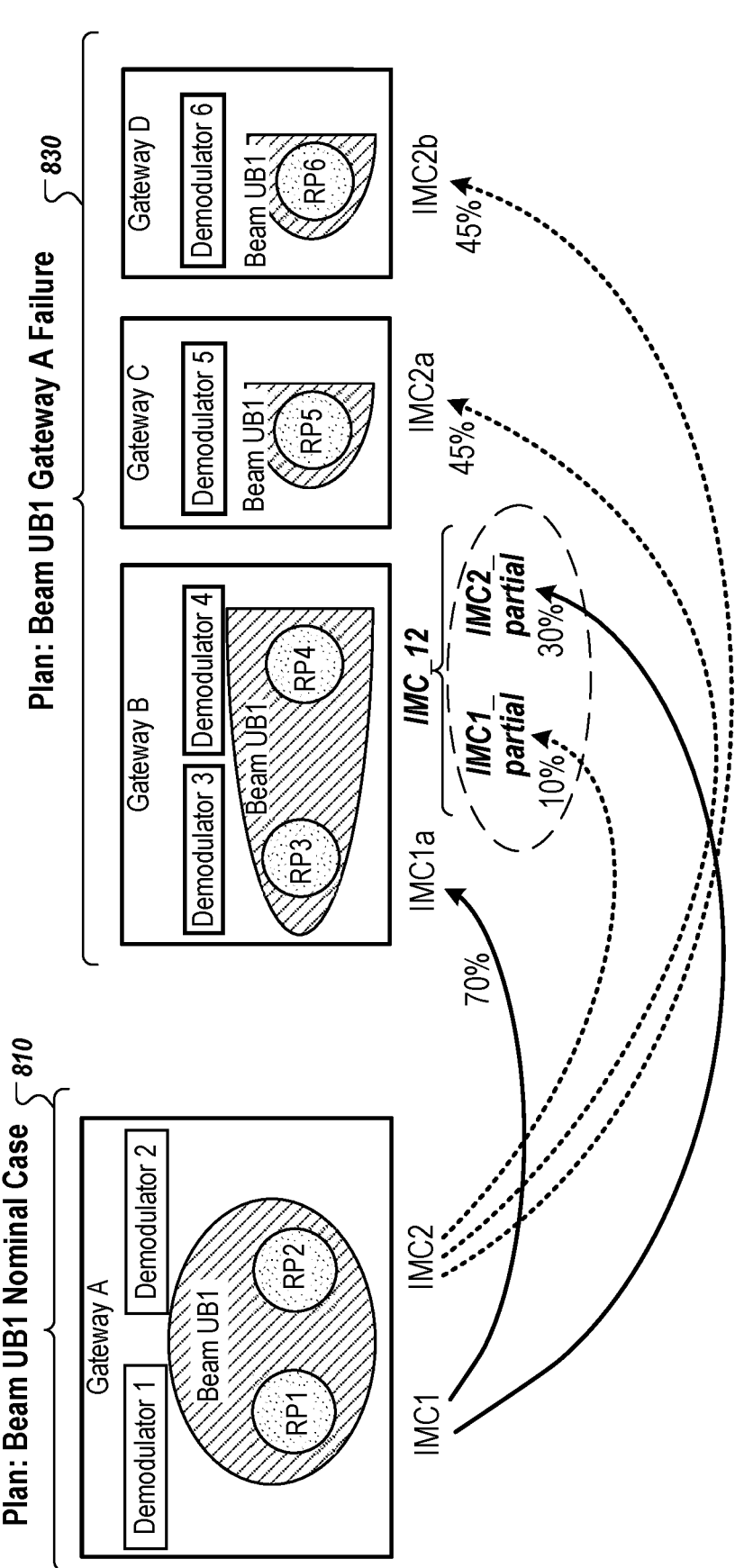

FIG. 8B shows a more complex example of frequency plans, where the IMCs of the frequency plan 810 for the nominal case has its IMCs segmented differently in a frequency plan 830 for the gateway A failure case. In this example, spectrum from different IMCs of the frequency plan 810 is split unequally, and one of the resulting IMCs of the frequency plan 830 combines spectrum from different IMCs of the frequency plan 810. For example, IMC1 from the frequency plan 810 is divided into IMC1*a* (e.g., 70% of the IMC1 spectrum) and IMC1_partial (e.g., 30% spectrum of the IMC1 spectrum), and IMC2 from the frequency plan 810 is divided into IMC2_partial (e.g., 10% of the IMC2 spectrum), IMC2*a* (e.g., 45% of the IMC2 spectrum) and IMC2*b* (e.g., 45% of the IMC2 spectrum). In the frequency plan 830, the IMC1_partial and IMC2_partial spectrum chunks are combined to form IMC_12. IMC1*a* is assigned to one demodulator of gateway B and IMC12 is assigned to the other gateway B demodulator. IMC2*a* and IMC2*b* are assigned to one demodulator of gateway C and gateway D, respectively. In this case, at least five inroute carve-outs need to be created.

Referring again to FIG. 7B, the IGM relay function that allows forwarding of data in a DC/SNC ensures the replication of burst time plan messages by using an inter-IGM communication scheme. Inroute control messages are replicated by the CRO relay function by using inter-CRO communication. A burst time plan message is generated individually for each of the inroute carve-outs. For example, consider a case where one source IGM is servicing two inroute carve-outs. These two inroute carve-outs are assigned to two different target IGMs. Therefore, this source IGM will relay the burst time plan messages of the first inroute set to one target IGM and the burst time plan messages of the second inroute set to the second target IGM, where these two target IGMs could be associated with two different gateways. The reconfiguration process conveys the association of inroute carve-outs to various target IGMs to the source IGM.

In the example of FIG. 7A, with two outroutes in the resource pool RP1 and before gateway failover, for associated return channels of this resource pool RP1, inroute control messages are replicated through both outroutes so that a terminal on any of the outroutes can view and use any inroute carve-outs of the resource pool RP1. This facilitates a better statistical multiplexing on inroute resources. In FIG. 7B, after the failover, the original resource pool RP1 has been divided into two (e.g., RP1*a* and RP1*b*) and one outroute is assigned to each resource pool and inroute spectrum is also divided. Once this reconfiguration happens, both inroute carve-outs are no longer advertised through both the two resulting outroutes. The selected inroute carve-out used by a terminal before the failover may belong to the other outroute being served from another different gateway after failover.

Creating a number of inroute carve-outs based on the worst-case frequency plan reduces statistical multiplexing gain. Then, if many resource pools are created in the nominal case (e.g., no gateway has failed) with one outroute in each resource pool, the system will lose even more statistical multiplexing gain. The nominal case represents normal operation and the system cannot lose so much with respect to statistical multiplexing.

As an example, in some implementations, the baseband system is given at least a minimum amount of time, such as a 30-second time window, to prepare and synchronously switch to a new frequency plan. Within this time window, as preparation, terminals that are active check which inroute carve-outs they are using. If it is determined that frequency reconfiguration will cause a terminal's current inroute carve-out to no longer correspond to post-configuration assignment of the outroute the terminal is currently using, a defined mechanism is used so that terminal can move to the other inroute carve-out seamlessly. During a preparation phase, each outroute broadcasts the identities of inroute carve-outs that the outroute will serve after the reconfiguration is completed. This list can be broadcast as a control message. Each active terminal verifies if it is currently using any of the inroute carve-outs advertised on its outroute. If a terminal is using an inroute carve-out advertised on its outroute, the terminal does not take any action and does not change its selected inroute carve-out until reconfiguration is over. On the other hand, if a terminal is not using any of the inroute carve-outs being advertised on its outroute, then the terminal sends a request to the Inroute Resource Manager (IRM) to change its inroute carve-out. The IRM makes the transition seamlessly without requiring the terminal to lose its stream allocation. In some cases the IRM may allocate the terminal's stream allocation from the requested inroute carve-out with an inroute less than the terminal's current symbol rate, and the IRM can make the change while honoring the allocation type, such as backlog-based allocation or guaranteed allocation. During the period of transition between two inroute carve-outs, a terminal listens for bandwidth allocation from both inroute carve-outs and looks for its inroute assignment identifier. Then, the terminal switches its inroute bursts to the appropriate inroute carve-out as needed.

The design is applicable to cases of multiple gateway failures. When the failed gateway(s) are brought back and the frequency plan is reversed (e.g., going back to nominal, such as switching from frequency plan 820 to frequency plan 810 in FIG. 8A), the reverse operation will be performed that includes the same techniques discussed above of traffic and message replication, freezing bandwidth, and enabling fast timing acquisition.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:

managing, by the one or more computers, a satellite communication network to operate in a first configuration, wherein the satellite communication network includes a satellite having a payload that enables dynamic reconfiguration of carriers within a beam, wherein the satellite communication network includes (i) multiple data centers or satellite network cores and (ii) multiple gateways, and wherein the first configuration includes a set of carriers for beams of the satellite and an assignment of the carriers to the gateways;

detecting, by the one or more computers, a reconfiguration event while the satellite communication network is operating in the first configuration;

in response to detecting the reconfiguration event, determining, by the one or more computers, a second configuration for the satellite communication network, wherein the second configuration differs from the first configuration in at least one of a set of carriers used for the beams or an assignment of the carriers to the gateways; and determining the second configuration comprises performing a dynamic outroute reconfiguration process that includes determining, for a forward link spectrum chunk:

a number of outroute carriers; and a bandwidth for each of the outroute carriers; and managing, by the one or more computers, the satellite communication network to operate in the second configuration, including at least one of (i) changing to a second set of carriers for the beams of the satellite or (ii) changing to a second assignment of the carriers to the gateways.

2. The method of claim 1, comprising associating each of the multiple gateways to each of the multiple data centers or satellite network cores to enable redundancy to permit assignment of a spectrum chunk among the multiple gateways.

3. The method of claim 1, wherein detecting the reconfiguration event comprises detecting a change to remove at least a portion of a first gateway in the satellite communication network; and wherein the second configuration includes a reassignment of one or more carriers served by the first gateway to one or more second gateways in the satellite communication network.

4. The method of claim 1, wherein detecting the reconfiguration event comprises detecting a change to add an additional gateway to the satellite communication network; and wherein the second configuration includes a reassignment of one or more carriers served by the gateways of the satellite communication network to the additional gateway.

5. The method of claim 1, wherein detecting the reconfiguration event comprises detecting a change to a spectrum allocation for a beam or gateway of the satellite communication network; and wherein, compared to the first configuration, the second configuration includes a change, for one or more of the carriers in a beam of the first configuration, to at least one of:

a number of carriers in the beam;

a bandwidth of one or more carriers in the beam;

a center frequency of one or more carriers in the beam; or a symbol rate of one or more carriers in the beam.

6. The method of claim 1, wherein detecting the reconfiguration event comprises detecting an unequal distribution of traffic or carriers among gateways of the satellite communication network; and wherein the second configuration includes a reassignment of one or more carriers served by a first gateway of the satellite communication network to one or more of the other gateways of the satellite communication network.

7. The method of claim 1, wherein managing the satellite communication network to operate in the second configuration comprises causing two or more of the gateways in the satellite communication network to serve different carriers of a same beam of the satellite.

8. The method of claim 1, wherein a first group of the gateways are associated with a first data center or satellite network core (DC/SNC), and a second group of gateways are associated with a second DC/SNC; and managing the satellite network to operate in the second configuration comprises transferring one or more carriers of a particular beam, wherein the one or more carriers are transferred from a particular gateway that is associated with the first DC/SNC to another gateway determined to be associated with the first DC/SNC, such that user traffic sessions are maintained after transferring the one or more carriers.

9. The method of claim 1, wherein performing the dynamic outroute reconfiguration process further comprises determining, for the forward link spectrum chunk:

a symbol rate for each of the outroute carriers; and a center frequency for each of the outroute carriers.

10. The method of claim 9, wherein the dynamic outroute reconfiguration process comprises:

determining the number of outroute carriers based on a bandwidth of the spectrum chunk, a measure of frequency roll-off, and a maximum symbol rate per outroute carrier; and determining the symbol rates determined based on the bandwidth of the spectrum chunk, the measure of frequency roll-off, and the determined number of outroute carriers.

11. The method of claim 9, wherein the dynamic outroute reconfiguration process comprises:

defining an outroute channel layout for the outroute carriers including (i) defining frequency characteristics for a first outroute carrier based on a boundary of the spectrum chunk, a symbol rate assigned for the first outroute carrier, and a measure of frequency roll-off, and (ii) after defining the frequency characteristics for the first outroute carrier, defining frequency characteristics for one or more additional outroute carriers based on a bandwidth of the first outroute carrier; and assigning the outroute carriers to one or more of the gateways in the satellite communication network.

12. The method of claim 9, wherein the dynamic outroute reconfiguration process comprises determining an assignment of outroute carriers to modulators of the gateways and mapping the outroute carriers to corresponding hardware ports in the gateways.

13. The method of claim 1, determining the second configuration for the satellite communication network comprises performing a dynamic inroute reconfiguration process that comprises:

at least one of creating one or more inroute carriers, creating one or more inroute carrier groups, or adjusting one or more inroute carrier groups to add or remove an inroute carrier; and assigning inroute carriers or inroute carrier groups to demodulators of the gateways and inroute group managers of the data centers or satellite network cores.

14. The method of claim 13, wherein performing the dynamic inroute reconfiguration process comprises at least one of:

creating one or more inroute carriers from a spectrum chunk assigned to one or more of the gateways in the satellite network;

changing an assignment of inroute carriers to inroute group managers;

redefining properties of one or more inroute carriers when moving an inroute carrier to a different inroute group manager or to a different demodulator;

spitting an inroute carrier into multiple inroute carriers; and merging two or more inroute carriers into a single inroute carrier.

15. A system comprising:

one or more computers; and one or more computer-readable media storing instructions that are operable, when executed by the one or more computers, to cause the one or more computers to perform operations comprising:

managing, by the one or more computers, a satellite communication network to operate in a first configuration, wherein the satellite communication network includes a satellite having a payload that enables dynamic reconfiguration of carriers within a beam, wherein the satellite communication network includes (i) multiple data centers or satellite network cores and (ii) multiple gateways, and wherein the first configuration includes a set of carriers for beams of the satellite and an assignment of the carriers to the gateways;

detecting, by the one or more computers, a reconfiguration event while the satellite communication network is operating in the first configuration;

in response to detecting the reconfiguration event, determining, by the one or more computers, a second configuration for the satellite communication network, wherein;

the second configuration differs from the first configuration in at least one of a set of carriers used for the beams or an assignment of the carriers to the gateways; and determining the second configuration comprises performing an outroute reconfiguration process that includes determining, for a forward link spectrum chunk:

a number of outroute carriers; and a bandwidth for each of the outroute carriers; and managing, by the one or more computers, the satellite communication network to operate in the second configuration, including at least one of (i) changing to a second set of carriers for the beams of the satellite or (ii) changing to a second assignment of the carriers to the gateways.

16. The system of claim 15, wherein detecting the reconfiguration event comprises detecting a change to remove at least a portion of a first gateway in the satellite communication network; and wherein the second configuration includes a reassignment of one or more carriers served by the first gateway to one or more second gateways in the satellite communication network.

17. The system of claim 15, wherein detecting the reconfiguration event comprises detecting a change to add an additional gateway to the satellite communication network; and wherein the second configuration includes a reassignment of one or more carriers served by the gateways of the satellite communication network to the additional gateway.

18. The system of claim 15, wherein compared to the first configuration, the second configuration includes a change, for one or more of the carriers in the beam of the first configuration, to at least one of:

a center frequency of one or more carriers in the beam; and a symbol rate of one or more carriers in the beam.

19. The system of claim 15, wherein detecting the reconfiguration event comprises detecting an unequal distribution of traffic or carriers among gateways of the satellite communication network; and wherein the second configuration includes a reassignment of one or more carriers served by a first gateway of the satellite communication network to one or more of the other gateways of the satellite communication network.

20. One or more non-transitory computer-readable media storing instructions that are operable, when executed by one or more computers, to cause the one or more computers to perform operations comprising:

managing, by the one or more computers, a satellite communication network to operate in a first configuration, wherein the satellite communication network includes a satellite having a payload that enables dynamic reconfiguration of carriers within a beam, wherein the satellite communication network includes (i) multiple data centers or satellite network cores and (ii) multiple gateways, and wherein the first configuration includes a set of carriers for beams of the satellite and an assignment of the carriers to the gateways;

detecting, by the one or more computers, a reconfiguration event while the satellite communication network is operating in the first configuration;

in response to detecting the reconfiguration event, determining, by the one or more computers, a second configuration for the satellite communication network, wherein:

the second configuration differs from the first configuration in at least one of a set of carriers used for the beams or an assignment of the carriers to the gateways; and determining the second configuration comprises performing a dynamic outroute reconfiguration process that includes determining, for a forward link spectrum chunk:

a number of outroute carriers; and a bandwidth of one or more carriers in the beam; and managing, by the one or more computers, the satellite communication network to operate in the second configuration, including at least one of (i) changing to a second set of carriers for the beams of the satellite or (ii) changing to a second assignment of the carriers to the gateways.

* * * * *